Aug. 31, 1954  M. H. CORLEY ET AL  2,687,604
COMBINATION SHEETER AND WRAPPING MACHINE
Original Filed March 7, 1949  18 Sheets-Sheet 11
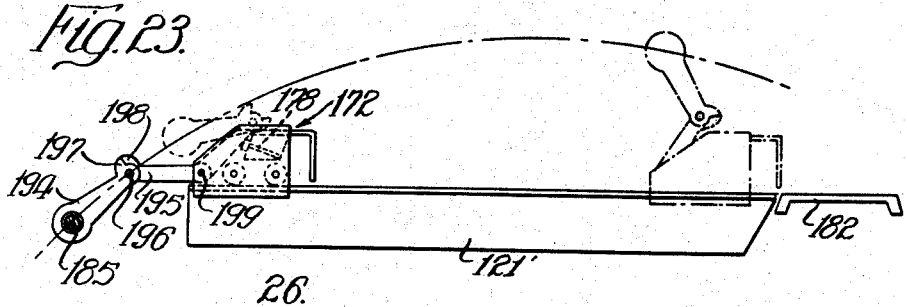
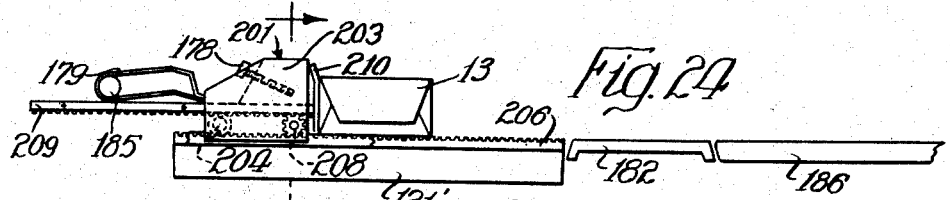
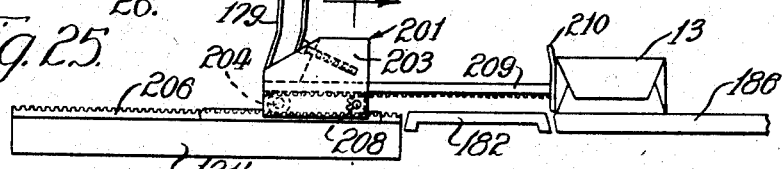
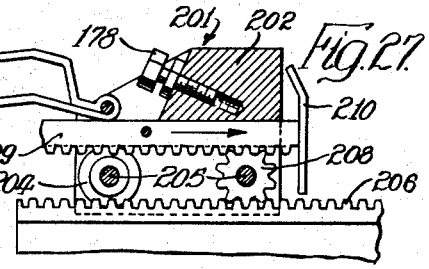
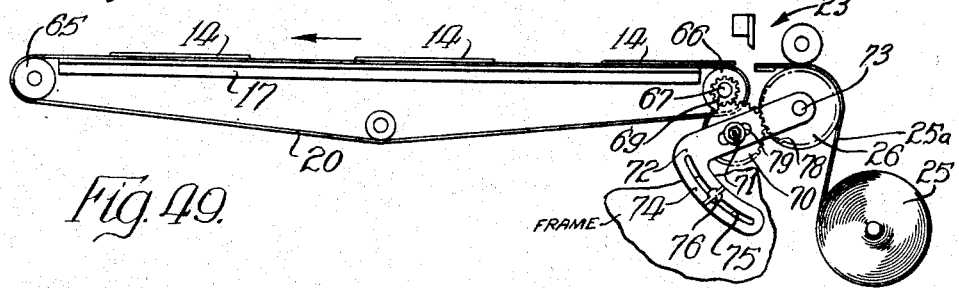
INVENTORS.
Mark H. Corley
BY Bengt A. Arvidson
Ralph F. Barber
Schroeder, Merriam,
Hofgren & Brady
attys.

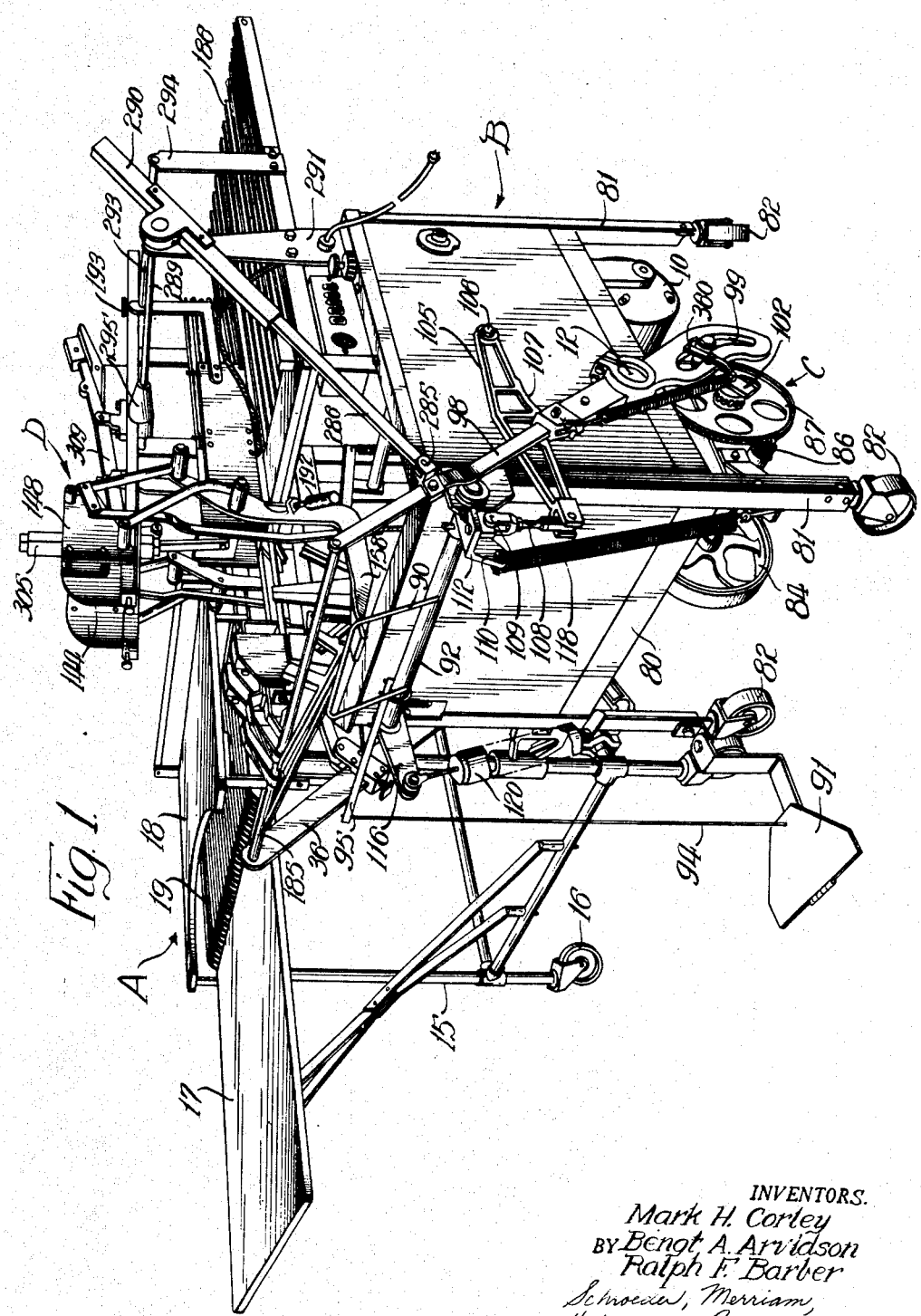

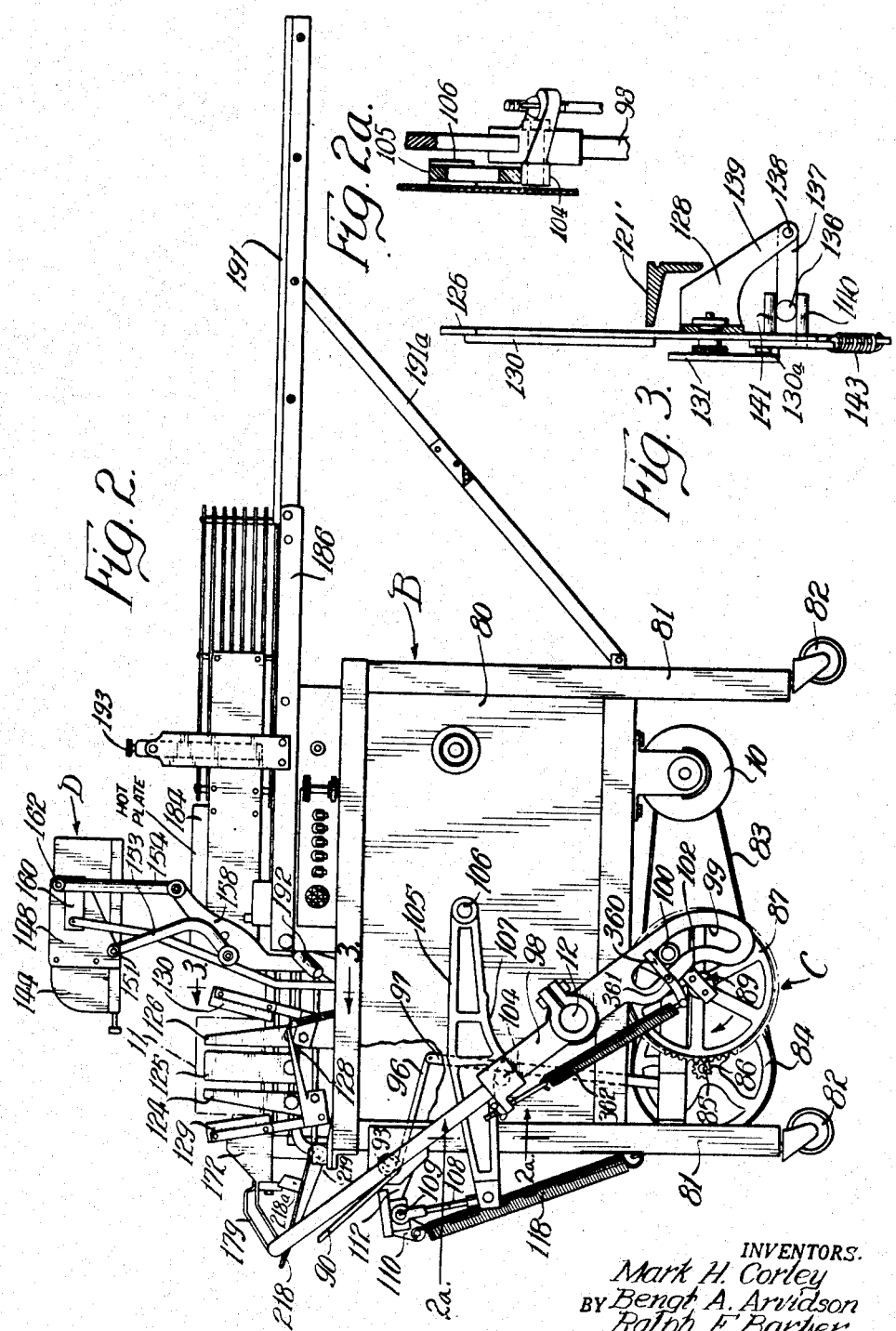

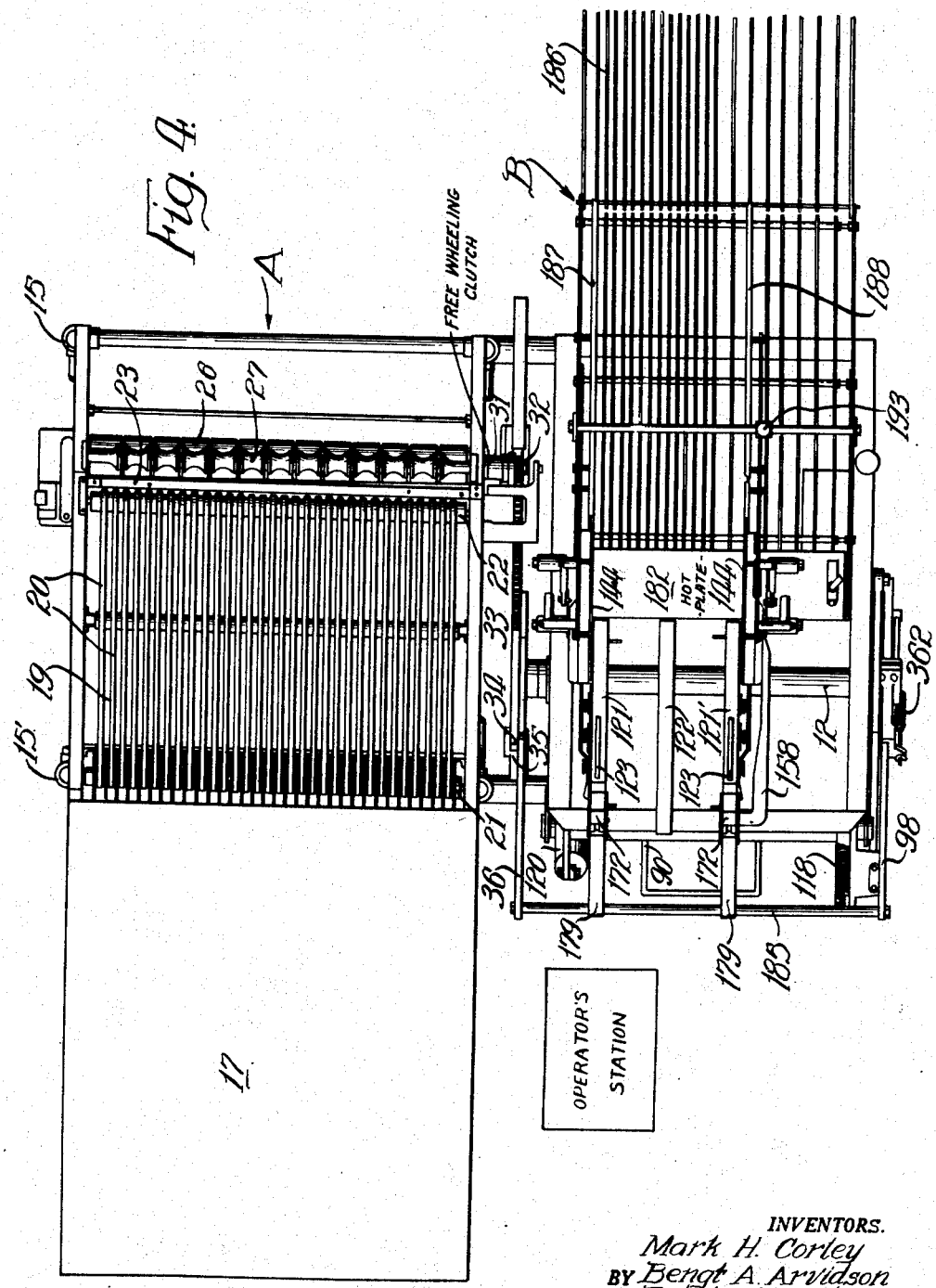

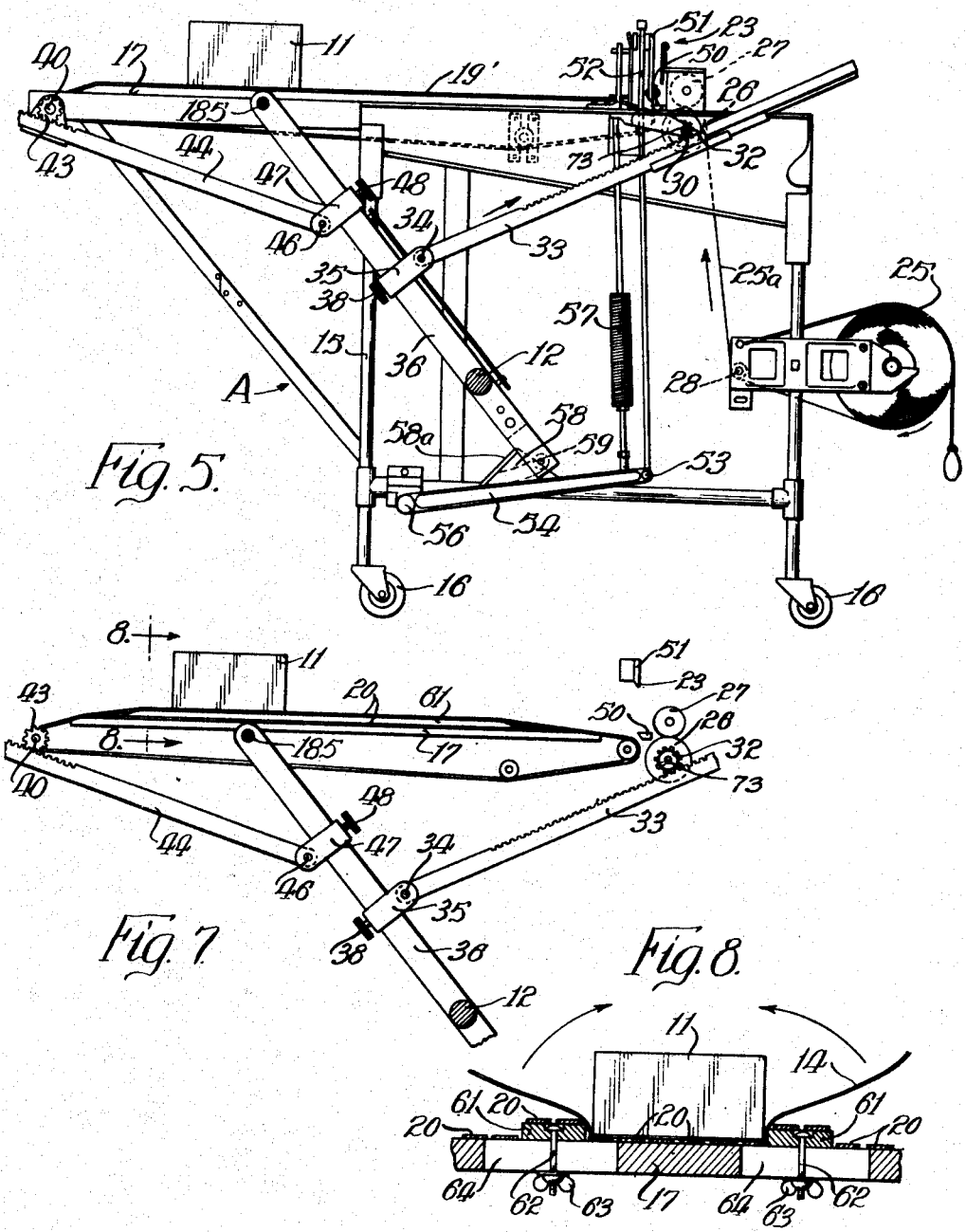

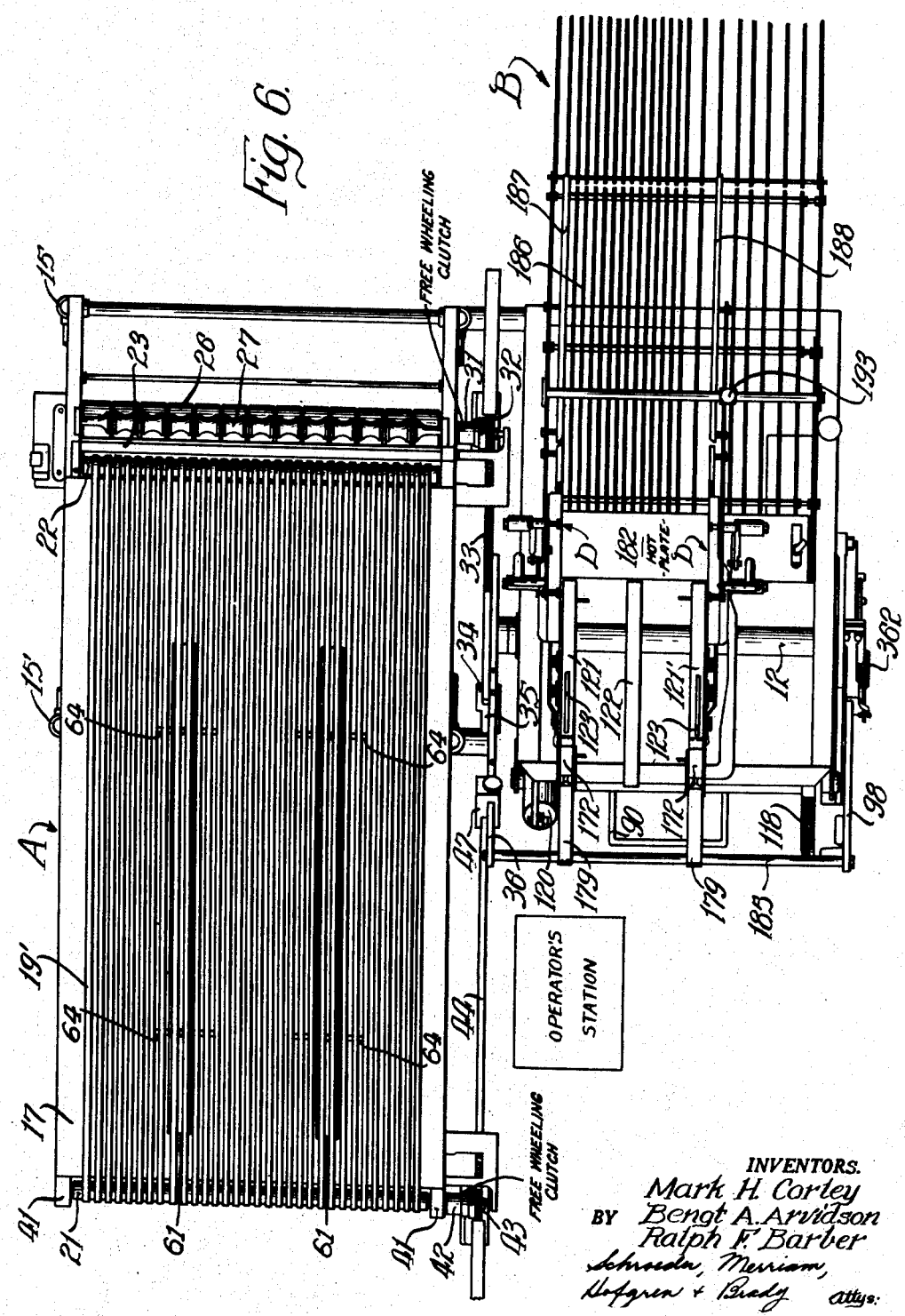

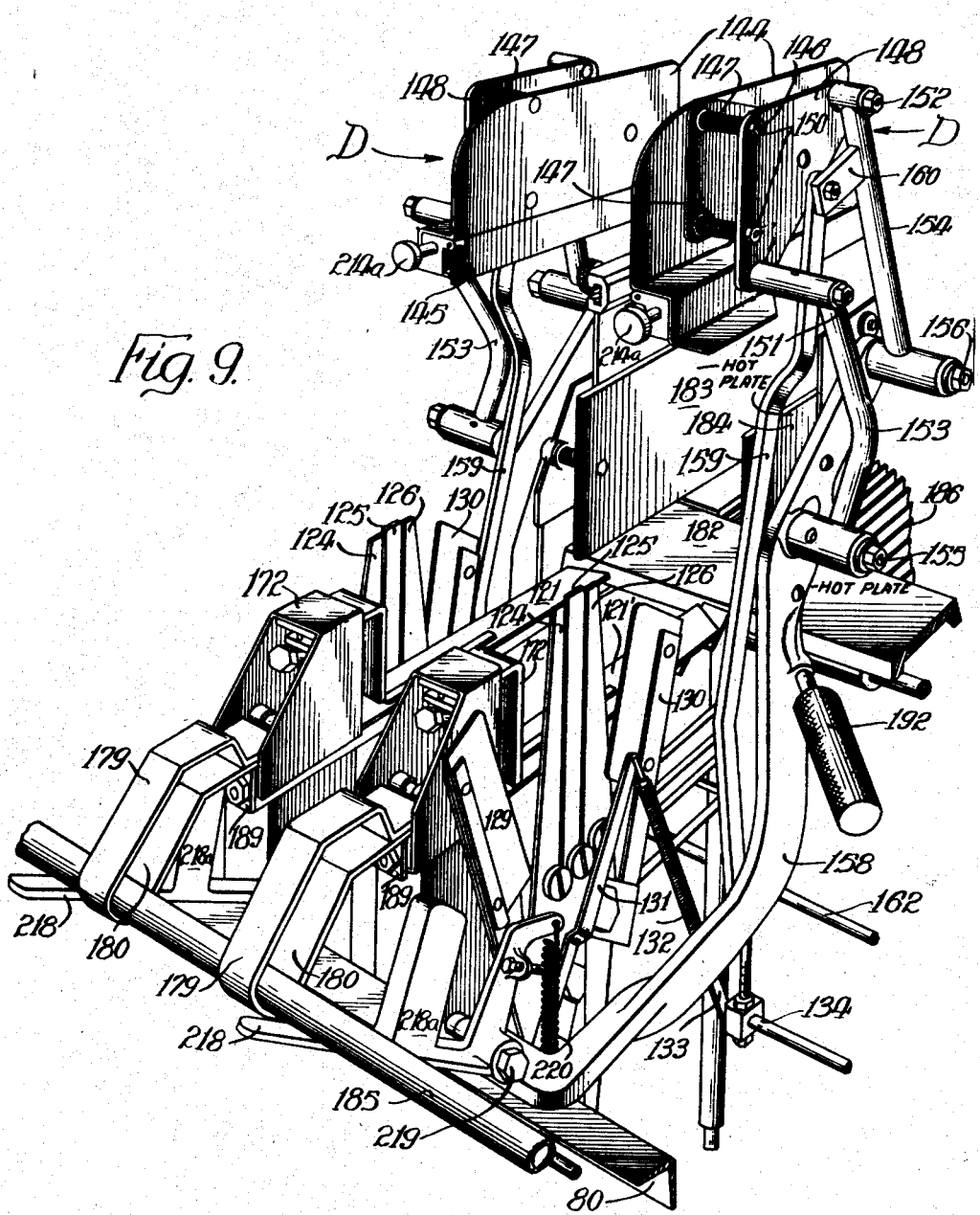

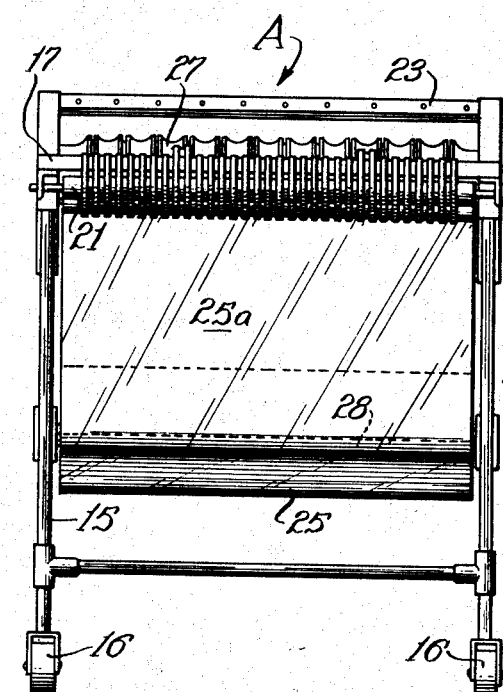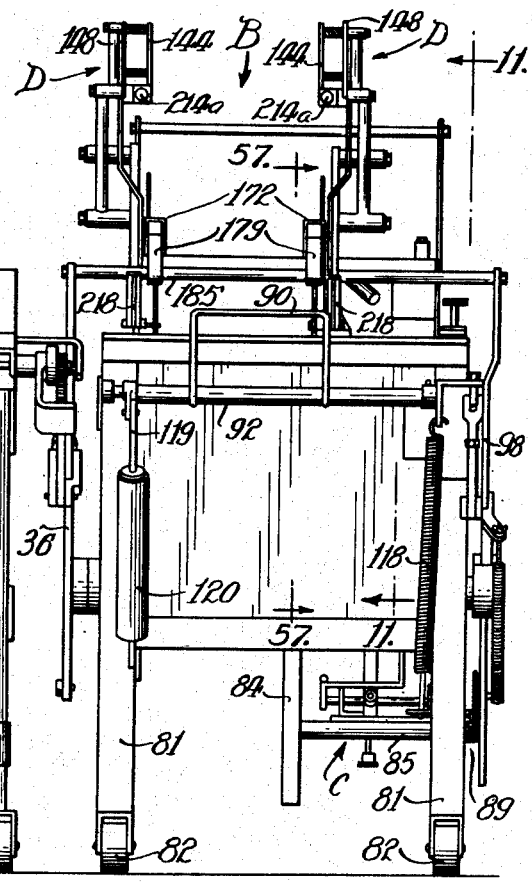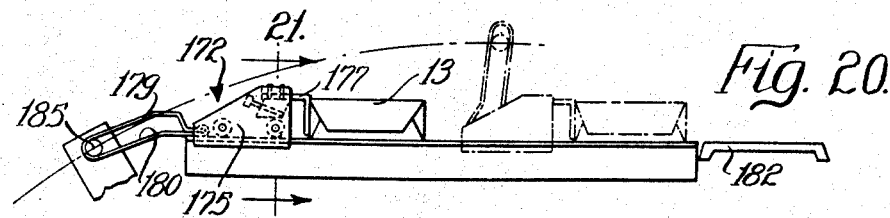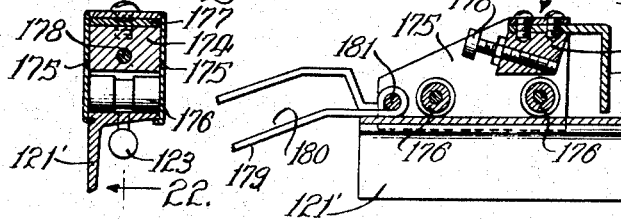

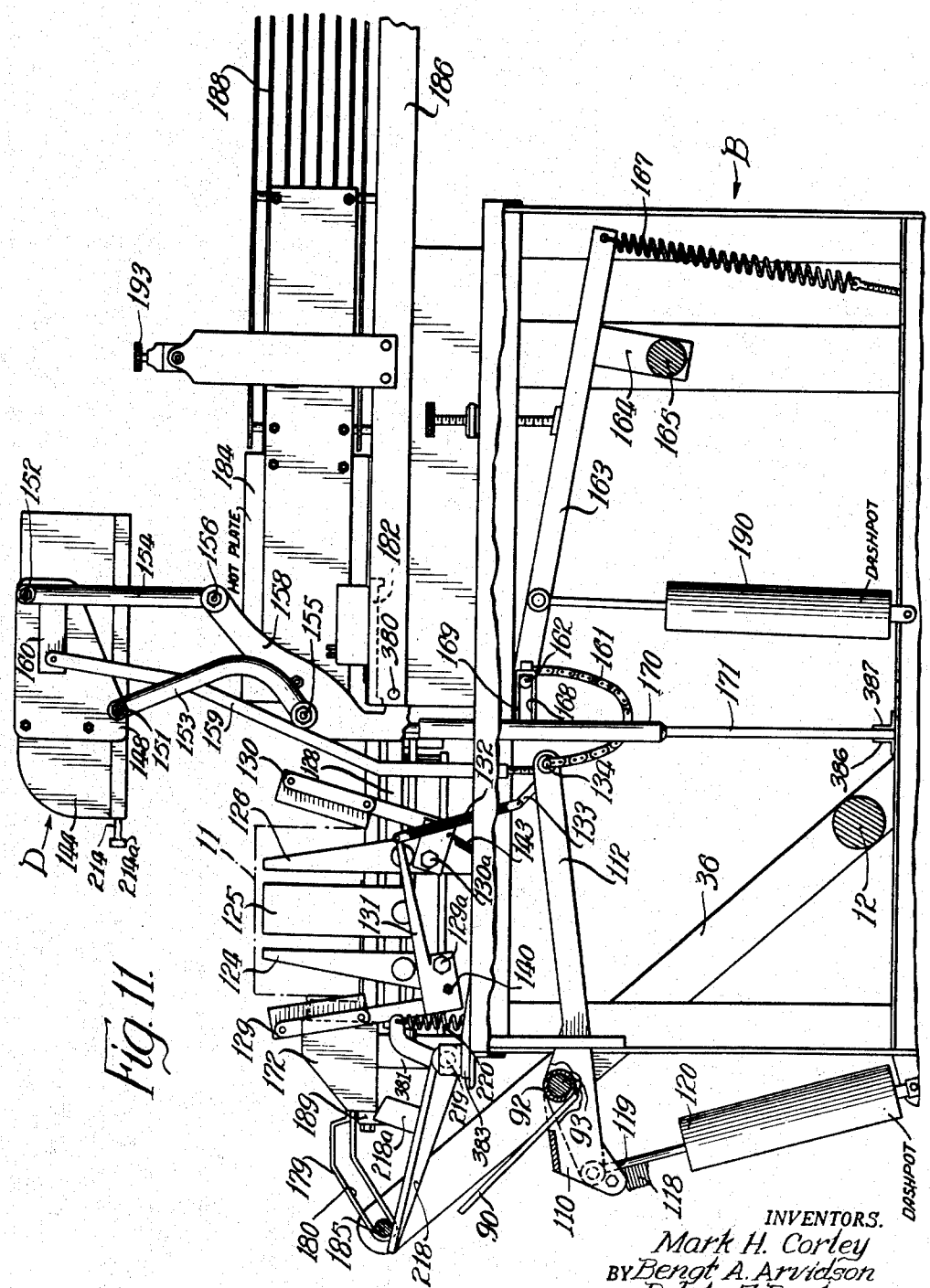

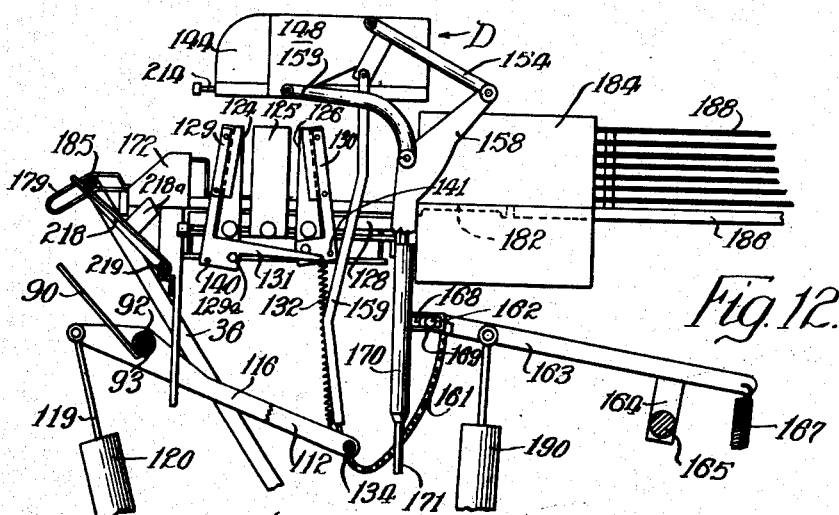

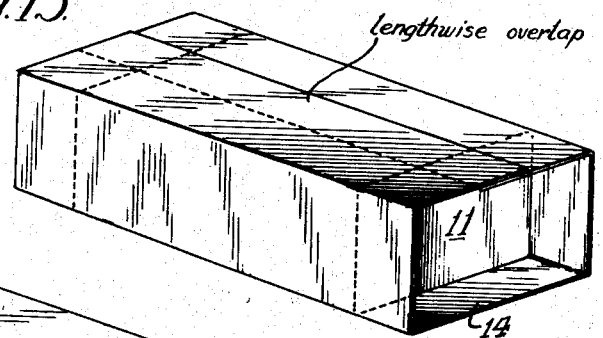
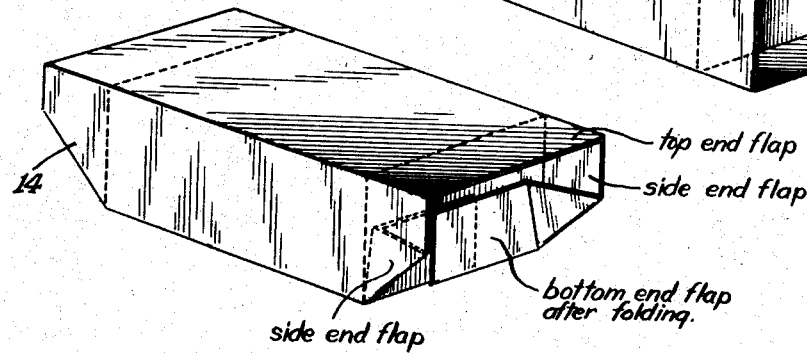
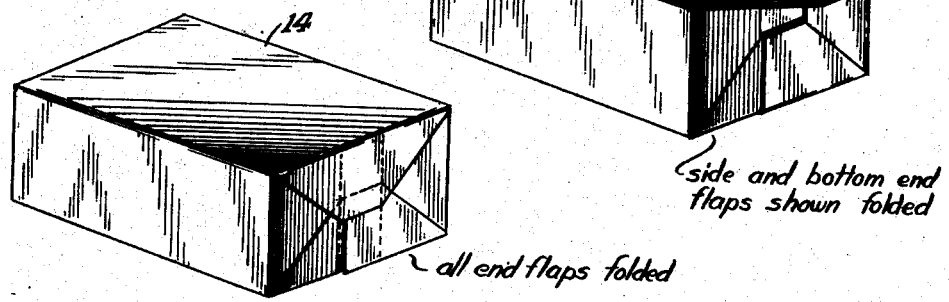
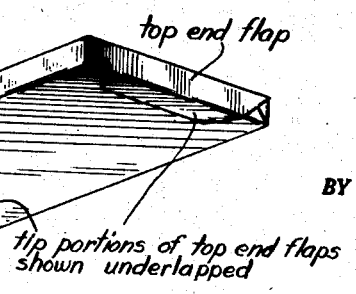

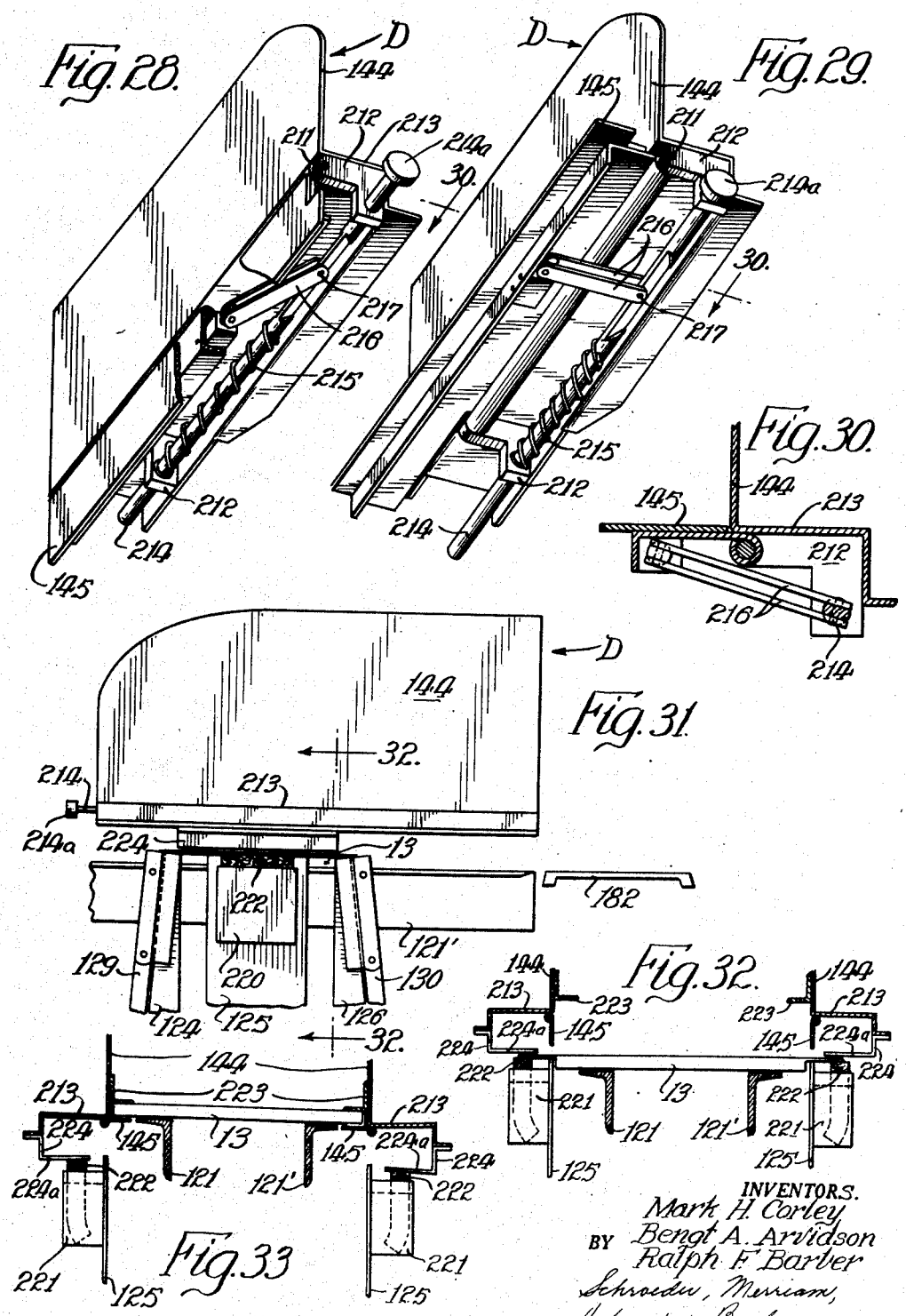

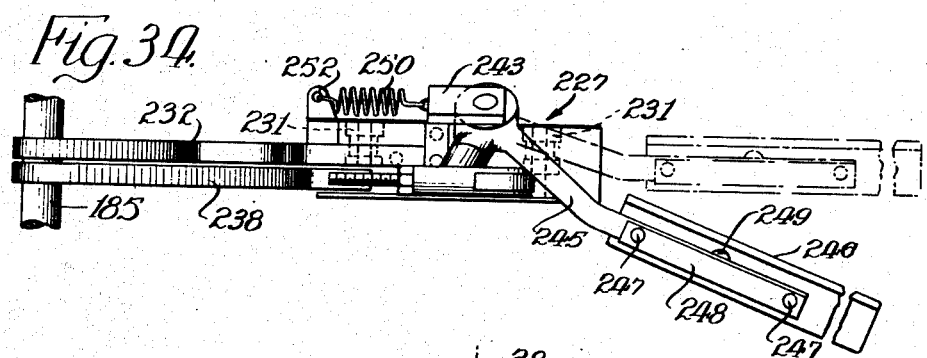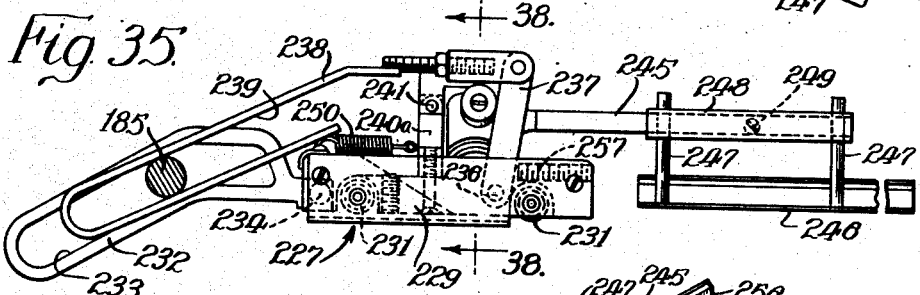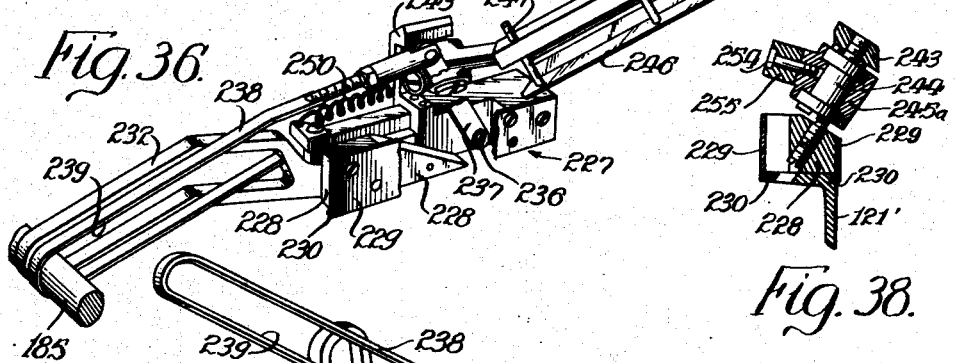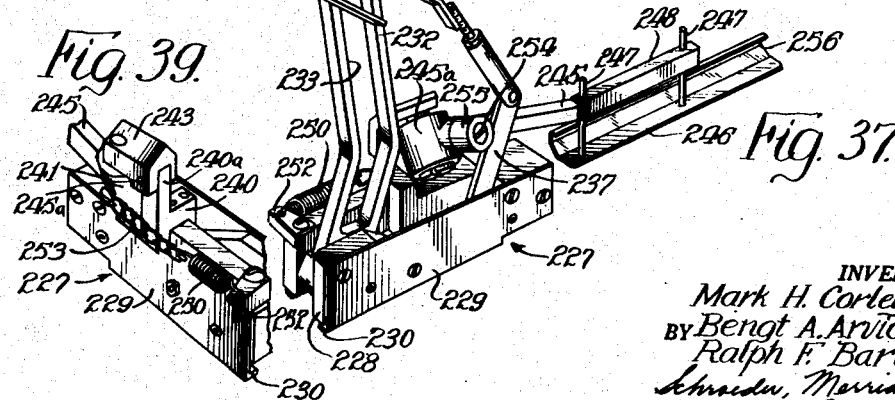

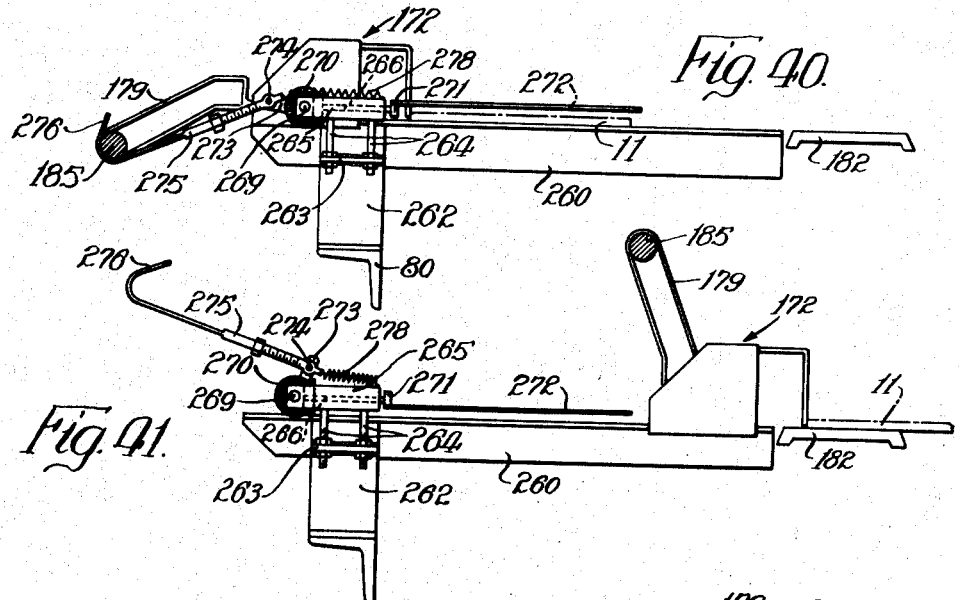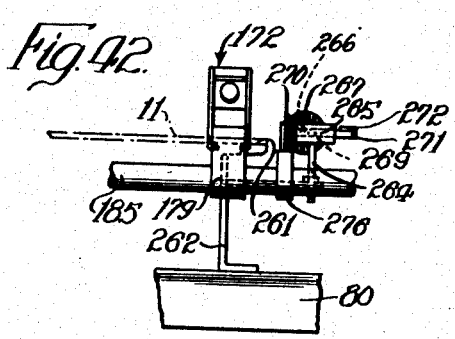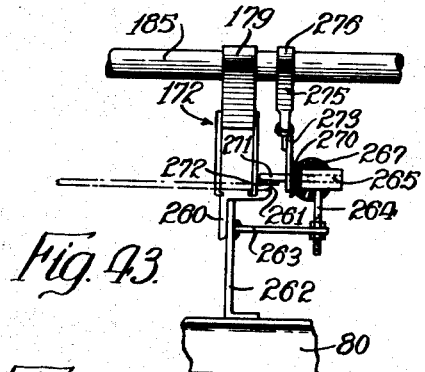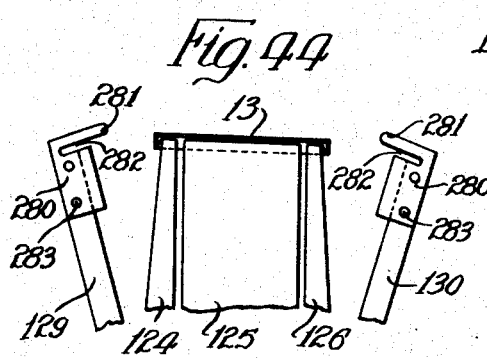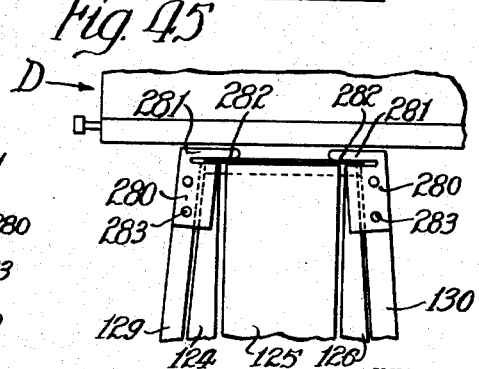

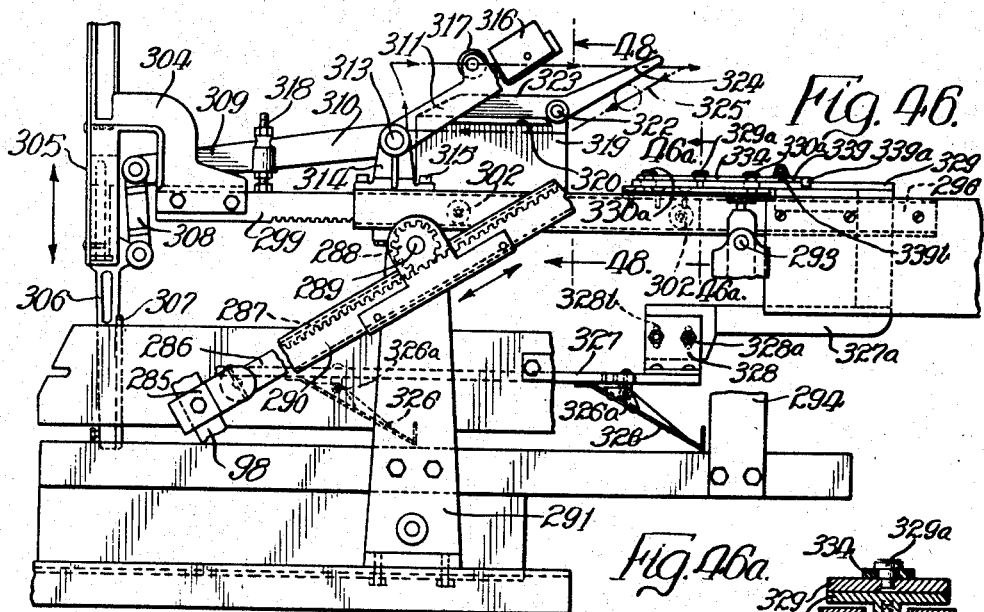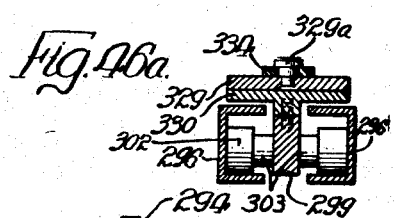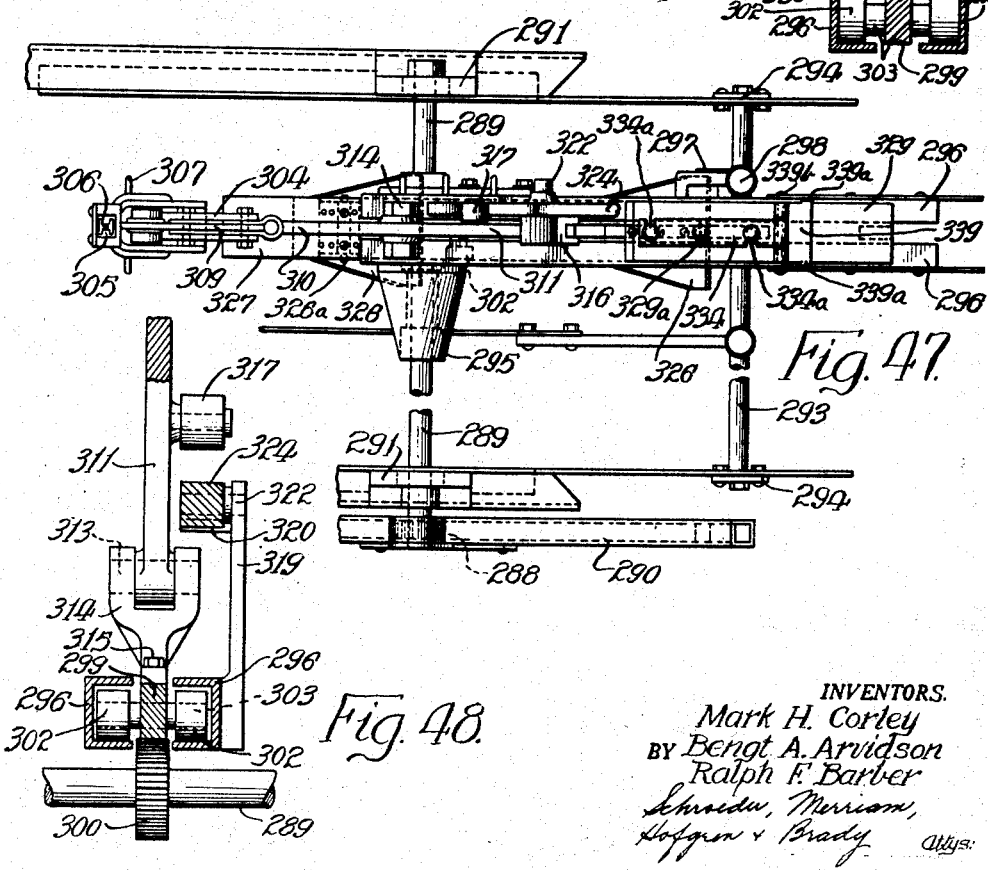

Aug. 31, 1954   M. H. CORLEY ET AL   2,687,604
COMBINATION SHEETER AND WRAPPING MACHINE
Original Filed March 7, 1949                    18 Sheets-Sheet 16
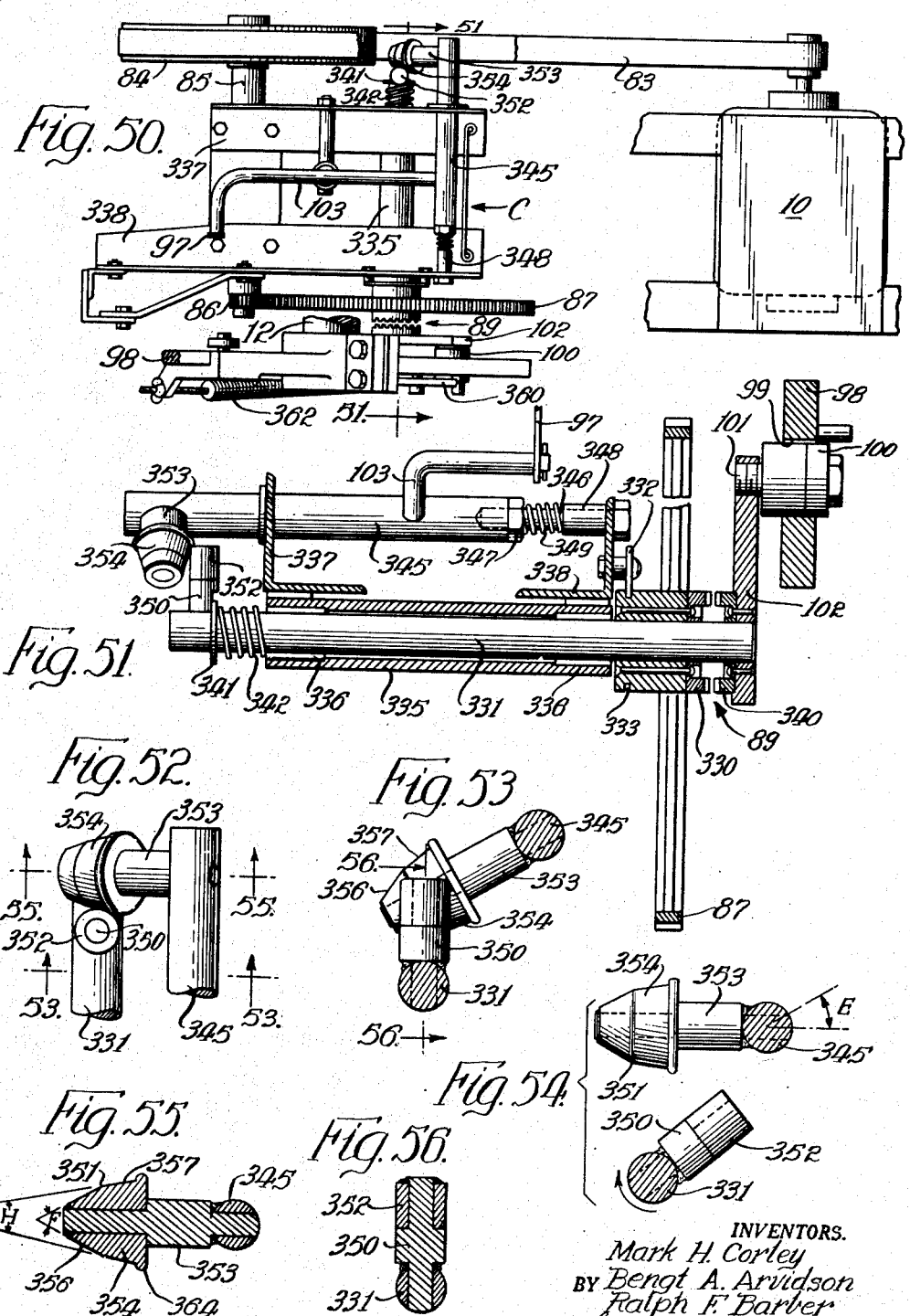

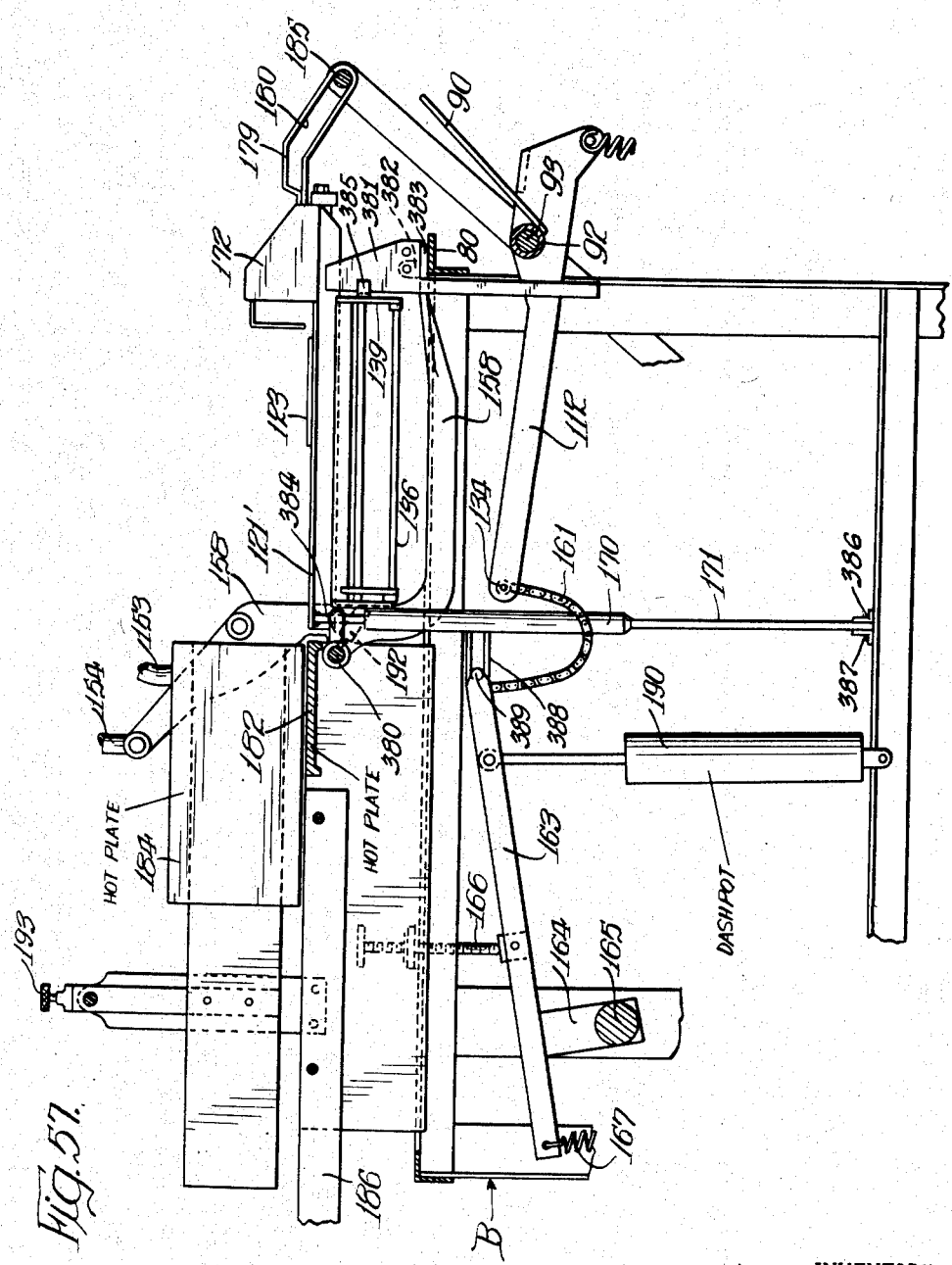

Aug. 31, 1954 M. H. CORLEY ET AL 2,687,604
COMBINATION SHEETER AND WRAPPING MACHINE
Original Filed March 7, 1949 18 Sheets-Sheet 18
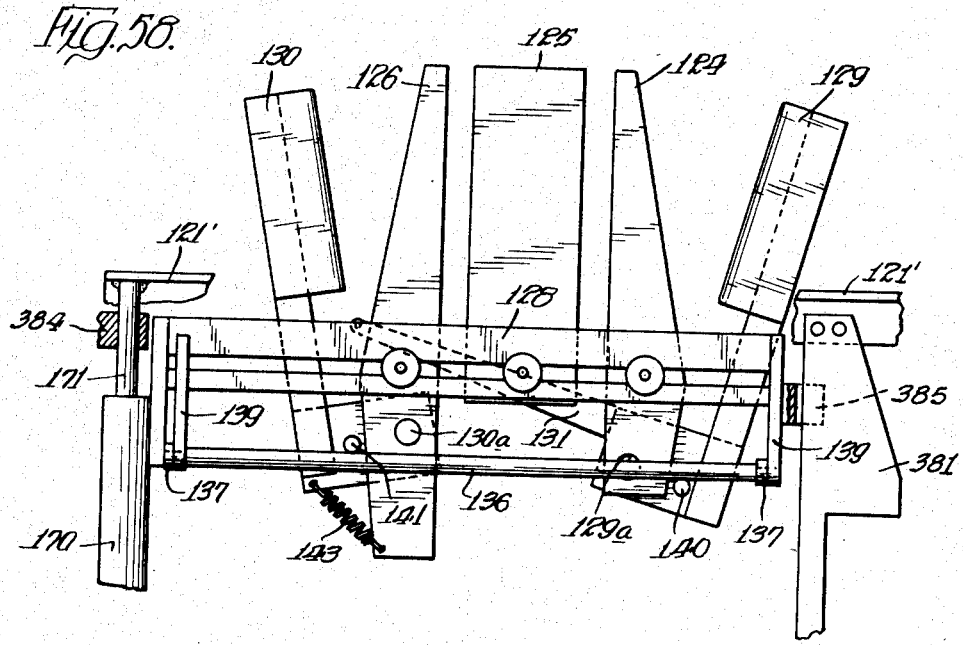
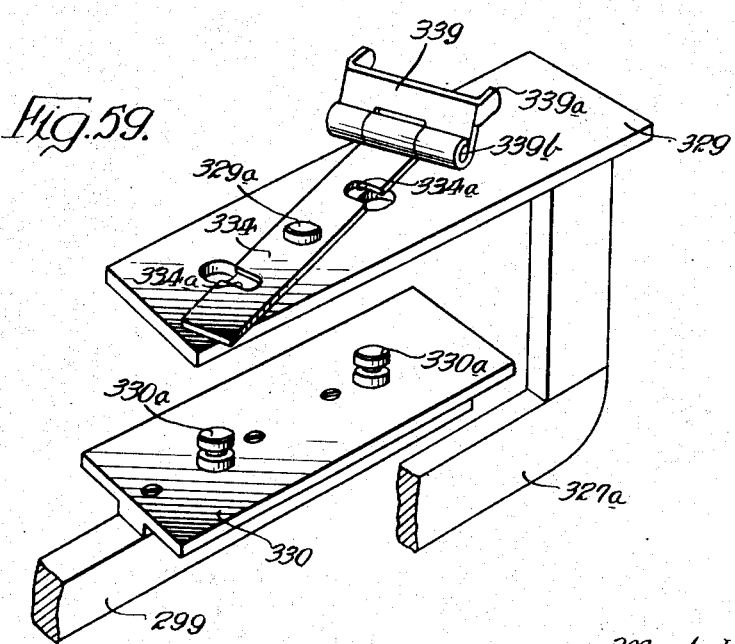
INVENTORS.
Mark H. Corley
Bengt A. Arvidson
Ralph F. Barber
By: Schroeder, Merriam,
Hofgren & Brady Attys.

Patented Aug. 31, 1954

2,687,604

UNITED STATES PATENT OFFICE 2,687,604

COMBINATION SHEETER AND WRAPPING MACHINE

Mark H. Corley, River Forest, Bengt A. Arvidson, Villa Park, and Ralph F. Barber, Elmhurst, Ill., assignors to Miller Wrapping & Sealing Machine Co., Chicago, Ill., a corporation of Illinois Original application March 7, 1949, Serial No. 79,956, now Patent No. 2,654,196, dated October 6, 1953. Divided and this application December 8, 1951, Serial No. 261,262

3 Claims. (Cl. 53—120)

This invention relates to packaging machinery and pertains more especially to wrapping and sealing machines of the semi-automatic type, and to sheeters designed for use with machines of that character, as well as separately.

The species of wrapping and sealing machines with which this application is more particularly concerned is one extensively employed in the wrapping of articles such as bread and other bakery products—being well suited to such purpose because of its quick and easy adaptability to the wrapping and sealing of packages of diverse sizes and proportions. But the utility of the present machine is not in any sense limited or largely confined to the bakery trade. On the contrary, certain of the major features of this invention are more concerned with the packaging of products such as butter, ice cream and the like, which cannot, without injury, be subjected to prolonged high temperatures, while still other features are concerned with special wrapping problems having to do, for example, with articles which are exceptionally thin, or extraordinarily bulgy, or of unusually light weight—characteristics rarely encountered in baked goods normally packaged by machines of the kind here dealt with.

A "sheeter," as that term is employed herein, is a piece of equipment which may be a separate and distinct entity or, alternatively, an integral part of the wrapping and sealing machine; the function of the sheeter is to cut wrapping material into pieces of identical size, each suitable for wrapping a particular article or unit group of articles, and operative to deliver the cut sheets, one at a time, to a point within easy reach of the operator, or to a predetermined position at which a step in the wrapping operation is to be performed. Such equipment can be and sometimes is utilized independently of a wrapping machine; but ordinarily it is not so employed; and in the typical embodiments of the invention herein described the sheeters are, in each instance, part and parcel of the wrapping machines themselves.

The machines hereinafter described are classified as "semi-automatic" because a part of the wrapping operation is performed by the operator, manually. This consists in placing an article-to-be-wrapped, or a prescribed quantity of material, as the case may be, on a sheet of wrapping material of appropriate size, folding the sheet around the article or material in the manner of a band, and then manually inverting the banded article and placing the same on the wrapping machine in position to be acted upon thereby. The above-described manual operation is known and referred to herein as the "banding operation"; and an article with a sheet of wrapping material banded therearound is referred to as a "banded article."

But the latter term ceases to be discriminative or apposite when the succeeding end-folding operations have been performed on the wrapper, and is not employed herein with reference to a package which has progressed beyond the initial banded stage.

The wrapping material most commonly used is moisture-proof cellophane. Such a material is advantageous because superimposed layers can quickly be bonded together through mere application of heat. This makes it easy to hermetically seal all wrapper overlaps, thus rendering the packages moisture-tight; and the machines herein described are equipped to perform the heat-sealing operations, in addition to the folding operations at the two ends of each package. Moisture-proof cellophane, however, is not the only wrapping material suitable for use with wrapping machines of the kind here dealt with; and at least one of the features of the subject invention pertains especially to a problem having to do exclusively with the use of non-heat-sealing wrapping material.

One of the objects of the present invention, which for reference purposes will be designated as the first object, is to expedite the manual portion of the wrapping operation; and to that end the sheeter has been modified so that it delivers the cut sheets of cellophane or other wrapping material, one at a time, to a position whereat the banding operation can be performed by the operator without the necessity of reaching for and moving the sheets manually along the sheeter table, as has been necessary in the past. This time-saving improvement has been brought about by the provision of a belt conveyor which is automatically advanced, periodically, by steps of such selected length that each cycle of operation of the wrapping machine is attended by delivery of a single sheet of wrapping material to the banding position on the conveyor, thus enabling the operator to perform the banding operation quickly, with a minimum of effort, and resultantly increasing his potential output.

A second object has also to do with the banding operation, and to that end we have found that substantial time savings can be effected by providing, in conjunction with the belt conveyor of the sheeter, a trough-like arrangement which is effective to turn upwardly the sides or flies of the wrapper when an article-to-be-wrapped is deposited thereon at the banding position on the conveyor. This improvement enables the operator quickly, and without impediment, to place his hands underneath the two flies of the wrapper— which he must do in order to carry out the banding operation—and thus obviates the delay incident to any difficulty the operator might otherwise experience in that respect. Maximum output per machine is inherently dependent upon performance of the multitudinous banding operations with the utmost dispatch; and it follows, as a matter of course, that oft-repeated delays caused by the wrappers lying flat are soon evidenced in noticeably diminished output. The organization which has been found most effective in this connection includes a belt conveyor comprising numerous laterally spaced, narrow, flexible belts in combination with a pair of strips or cleats located immediately below the upper span of the conveyor and adapted to be adjustably spaced apart laterally of the conveyor in conformity with the length of the article-to-be-wrapped—the spacing between the strips being, in each instance, sufficient to admit one such article at a time therebetween. When an article is deposited on a wrapper lying on the conveyor at the banding position, it is so placed by the operator that it will descend by gravity into the space between the aforementioned strips, and the ensuing downward movement of the article, abetted by the action of the strips, causes the flies of the wrapper to be deflected upwardly.

A third object of the invention is two-fold in nature, being (1) to facilitate placement of the banded articles on the track of the wrapping machine, and (2) to prevent inadvertent displacement of the pusher carriages from their initial or "at rest" positions. The pusher carriages are propelled by a pusher bar and, prior to this invention, have been equipped with so-called hooks extending upwardly therefrom and designed to be engaged by the pusher bar for the purpose of mechanically coupling the carriages to the pusher bar. The upwardly projecting hooks or corresponding elements have proved to be obstacles which considerably impede the operator in placement of the banded articles on the track of the wrapping machine, and, what is perhaps an even greater detriment, these hooks are wholly detached from the pusher bar when the machine is at rest, so that it is possible for the pusher carriages to be inadvertently displaced from their normal "at rest" positions, thereby giving rise to an ever-present liability of damage being done to packages in process. We have overcome the above-indicated deficiencies through the provision of a new kind of linkage coupling between the pusher bar and each pusher carriage, as will be set forth at length in the detailed description hereinafter.

A fourth object of this invention is to render practicable the wrapping and sealing in moisture-proof cellophane or the like of products such as butter and ice cream on a wrapping and sealing machine which is designed primarily for packaging products which are not susceptible of injury as a consequence of being subjected to heat-sealing temperatures for relatively prolonged periods. When the product to be packaged is not especially heat-sensitive, it is preferable to utilize a moderate sealing temperature and allow the packages to remain in contact with the hot plates for a somewhat extended period; but that cannot be done with heat-sensitive products such, for example, as butter and ice cream because the heat would penetrate into the product with obviously disastrous consequences. But it has been found that if a cellophane-wrapped package is subjected to a substantially higher temperature for a much shorter period, the sealing can be effected satisfactorily without damage to the product, because there is not sufficient time for the heat to penetrate deeply. We have, accordingly devised a so-called push-through mechanism, in the form of a modified pusher carriage, capable of being substituted in place of the more conventional pusher carriages and effective to move each package from the loading position to the far side of the heat-sealing zone at a single stroke of the pusher bar—all of which is accomplished without the necessity of altering the machine in any other respect and at comparatively little cost.

A fifth object is to provide an improved and simplified underlapping-wing-flap actuating mechanism, the features of which can best be presented in conjunction with the subsequent detailed description.

A sixth object is to provide effective means for applying solvent to the tip portions of the top end flaps of the wrappers when such tip portions are to be underlapped—which is to say, folded under and into contact with the bottom surface of the wrapper; and more especially so when the sheet wrapping material is cellophane or the like of the non-heat-sealing variety. An application of appropriate solvent, such as acetone, renders the said tip portions momentarily agglutinant and thus capable of instantly adhering to the said bottom contacting surface, thereby firmly securing the wrapper notwithstanding its want of the heat-sealing properties which characterize moisture-proof cellophane. We have been able successfully to achieve the instant object through a novel arrangement involving the use of solvent applicators (each including a solvent reservoir) comprising wicks carried by the respective up-folding fingers and movable vertically therewith. As the top-folding units descend and engage the top end flaps, they press the same downwardly against the solvent-saturated applicators; but immediately following contact, the up-folding fingers start descending, together with the solvent applicators, so that the latter are moved downwardly to make way for the top-folding and underlapping operations, while at the same time remaining in contact with the said tip portions, thereby ensuring a good and sufficient application of solvent immediately before the tip portions are pressed into contact with the under surface of the wrapper, thus limiting to a virtual minimum the interval during which solvent evaporation can occur.

A seventh object pertains to the provision of means adapted to facilitate the wrapping of articles which are quite thin, or which consist of bulgy material lacking propensity to lie flat, and other items having so little weight as to be incapable of counteracting the slight force involved in folding the end flaps of the wrapper; and to that end we have devised what we call "hold-down" mechanisms which automatically move into place and bear down slightly on the end margins of each banded article, after the same has been placed on the track of the wrapping machine, and which are effective, both to hold the banded articles down on the track and to flatten the end portions of bulgy articles so as to enable a neat end folding job to be performed by the machine. Two species of package hold-downs within the purview of this seventh object are shown and described, which, in both instances, are characterized in that they automatically move laterally and oppositely away from the track while the pusher carriages are returning to their starting positions, so that they are completely out of the way and incapable of interfering with manual placement of banded articles on the wrapping machine track.

An eighth object of the invention has to do more especially with the wrapping of thin packages. The yieldability of the wrapping material is such that when a package is quite thin, satisfactory side folds generally cannot be made with the ordinary folding means, due to upward deflection of the top end flaps of the wrapper and consequent distortion of the narrow side end flaps. We have found that by equipping the front and rear folding fingers with auxiliary laterally extending ears arranged to move, with said fingers, into overlying relation to the side portions of the top end flaps, the latter can successfully be restrained against upward deflection, thereby avoiding distortion of the narrow side end flaps. This results in a neat wrapping job such as we have not previously been able to accomplish mechanically with thin packages. The same feature also is successfully useable with other than thin packages and frequently results in a more clean-cut fold than would otherwise be achieved, even on thicker packages where its use is in no sense mandatory.

A ninth object has to do with the problem of moving packages into and then out of the heat-sealing zone, following a brief interval of exposure to the sealing temperature, but, unlike the fourth-stated object, is not primarily concerned with highly heat-sensitive products like butter and ice cream, which cannot be permitted to remain in contact with the hot plates more than an instant. There are other products, such as chocolate, for example, which are not so highly susceptible to injury by heat as the aforementioned ones and which can, accordingly, be allowed to remain in contact with the hot plates somewhat longer, but which nevertheless would be damaged if not removed following a rather short exposure period; and any package, regardless of contents, would be damaged if allowed to remain in contact with the hot plates for a period of extended duration, as when the operator may take time out or be preoccupied with some other duty and forget to remove a package from the heat-sealing zone. In the accomplishment of this object, we have devised what is referred to herein as an automatic pull-through mechanism, which may be attached to a conventional or standard wrapping machine of the type here dealt with and which functions to withdraw the packages from the heat-sealing zone following a predetermined exposure period, and does so during the same cycle of operation of the machine as that within which the package is started on its excursion from the loading point. With this provision, no package can be left standing in the heat-sealing zone for a more extended period than is the case when the push-through mechanism according to the fourth object is employed.

A tenth object is to improve the clutch-control mechanism of our wrapping and sealing machine so that it will trip more easily, while being longer wearing, and at the same time non-susceptible to damage resulting from failure of the clutch to disengage, as has been the case with similar prior-art clutch-control mechanisms. The improvements by which we have realized these desired ends will be fully explained as a part of the ensuing detailed description.

All of the several novel features of this invention involve either modifications of or additions to wrapping and sealing machines of a type long in use and well known; but in order to make completely clear the functions and utility of the several improvements and additions, it is considered expedient to incorporate in this specification a fairly extensive general description of an entire machine. This has been done as compendiously as seems feasible, but adequately, we believe, to enable anyone with elementary mechanical knowledge to apprehend not only the workings of the machine as a whole, but also the structural and functional relationship between the several new features and the portions of the machine which belong to the prior art.

In the drawings which accompany this specification:

Figure 1 (Sheet 1) is a perspective view of a complete wrapping and sealing machine, including a sheeter, and it exhibits some but not all of the features of novelty which are dealt with in this specification;

Fig. 2 (Sheet 2) is a side elevation of the wrapping and sealing machine, intended primarily for reference in connection with the general description which follows, and not particularly with reference to the novel features of the invention;

Fig. 2a (Sheet 2) is a detail section, taken on line 2a—2a of Fig. 2;

Fig. 3 (Sheet 2) is a fragmentary transverse section, taken at line 3—3 of Fig. 2;

Fig. 4 (Sheet 3) is a plan view of the wrapping and sealing machine and sheeter of Fig. 1, but from which various details have been omitted in the interest of simplicity and clarity, the omitted details being sufficiently shown in other views;

Fig. 5 (Sheet 4) is an elevational view of a sheeter, including a modified belt conveyor which differs from that shown in Fig. 1; the view here is looking in the same direction as Fig. 2 and includes a drive arm which forms a constituent part of the wrapping and sealing machine per se;

Fig. 6 (Sheet 5) is a plan view of a wrapping and sealing machine, together with a sheeter in accordance with Fig. 5;

Fig. 7 (Sheet 4) is a fragmentary elevational view, similar to Fig. 5, depicting a modification which involves the use of a pair of belt supporting and elevating strips or cleats associated with the sheeter conveyor and serving to form a trough at the banding position for centering articles-to-be-wrapped and for deflecting upwardly the flies of each successive wrapper;

Fig. 8 (Sheet 4) is an enlarged sectional view, taken at line 8—8 of Fig. 7;

Fig. 9 (Sheet 6) is a fragmentary perspective view, on an enlarged scale, of a portion of the wrapping and sealing machine, showing, among other parts, the track along which the packages move, the pusher carriages which serve to propel the packages along the track, the pusher carriage connecting links, the pusher bar, the folding fingers, the top folding units, including the underlapping wings, together with the underlapping wing actuating mechanism, the bottom heat-sealing plate, together with one of the two end heat-sealing plates, and the cooling bed;

Fig. 10 (Sheet 7) is a front elevation of the wrapping and sealing machine, together with the sheeter of Figs. 5, 7 and 8;

Figs. 11–14 inclusive (Sheets 8 and 9) are a series of fragmentary sectional views of the wrapping and sealing machine, taken rearwardly of Fig. 2, approximately at line 11—11 of Fig. 10, and illustrating successive steps in a single cycle of operation;

Fig. 15 (Sheet 10) is an isometric view of a rectangular article with a wrapper of cellophane or other sheet material banded therearound, illustrating the manually-performed banding operation;

Fig. 16 (Sheet 10) is an isometric view illustrating the first step in the operation of folding the end flaps of the wrapper—the bottom end flaps having been folded upwardly;

Fig. 17 (Sheet 10) is an isometric view of the same package, illustrating the second step in the operation of folding the end flaps of the wrapper—the side end flaps being shown folded, in addition to the bottom end flaps which were previously folded;

Fig. 18 (Sheet 10) is an isometric view illustrating the third and final step in the operation of folding the end flaps, the top end flaps having been folded down over the bottom and side end flaps;

Fig. 19 (Sheet 10) is an isometric view of a completed thin package, illustrating a case in which the top end flaps are underlapped and sealed to the bottom surface of the wrapper;

Fig. 20 (Sheet 7) is a fragmentary elevational view showing the wrapping machine track and a pusher carriage mounted thereon, together with the pusher bar and connecting link and the bottom hot plate—illustrating the manner of operation of the pusher carriages in propelling the packages along the track and thence into the heat-sealing zone;

Fig. 21 (Sheet 7) is an enlarged transverse section through a pusher carriage and supporting rail, taken at line 21—21 of Fig. 20;

Fig. 22 (Sheet 7) is a lengthwise sectional view, taken at line 22—22 of Fig. 21;

Fig. 23 (Sheet 11), which is a fragmentary elevational view similar to Fig. 20, illustrates an alternative linkage for connecting the pusher carriage with the pusher bar;

Fig. 24 (Sheet 11) is an elevational view illustrating a pusher carriage and track construction including a motion-amplifying pusher mechanism by virtue of which the packages are moved, at a single stroke of the pusher bar, twice the distance they would otherwise be moved, thereby making it possible to propel each package, at a single uninterrupted stroke, from the loading position on the track into and completely through the heat-sealing zone, without entailing a major change in the design and construction of the machine;

Fig. 25 (Sheet 11) is an elevational view corresponding to Fig. 24, but showing the pusher carriage in fully advanced position;

Fig. 26 (Sheet 11) is an enlarged transverse section, taken at line 26—26 of Figs. 24 and 25;

Fig. 27 (Sheet 11) is a sectional view, taken at line 27—27 of Fig. 26;

Figs. 28 and 29 (Sheet 12) are two isometric views, looking upwardly from below, illustrating an improved underlapping wing actuating mechanism;

Fig. 30 (Sheet 12) is a transverse sectional view, taken at line 30—30 of Fig. 29;

Fig. 31 (Sheet 12) is a fragmentary elevational view illustrating an adaptation and addition to the wrapping machine of means for applying solvent to the tips of the top end flaps, especially on thin packages, where it is necessary or desirable to underlap the top end flaps and secure the underlapped portions to the bottom surface of the wrapper;

Figs. 32 and 33 (Sheet 12), which are transverse sections taken at line 32—32 of Fig. 31, depict, in consecutive steps, the application of solvent to the tips of the top end flaps and the underlapping of the solvent-wetted tips into contact with the bottom surface of the wrapper;

Figs. 34 and 35 (Sheet 13) are plan and elevational views, respectively, of a novel package-hold-down device which is especially useful for holding down light packages and for leveling the tops of bulgy packages while the end flaps are being folded;

Figs. 36 and 37 (Sheet 13) are perspective views of the hold-down device of Figs. 34 and 35, showing the hold-down shoe in the retracted and active positions, respectively;

Fig. 38 (Sheet 13) is a transverse section, taken at line 38—38 of Fig. 35;

Fig. 39 (Sheet 13) is a fragmentary perspective view looking from the rear of Fig. 37;

Figs. 40 and 41 (Sheet 14) are side elevations illustrating an alternative package hold-down device;

Figs. 42 and 43 (Sheet 14) are corresponding end-wise views of the alternative package-hold-down device of Figs. 40 and 41, depicting the hold-down shoe in its retracted and active positions, respectively;

Figs. 44 and 45 (Sheet 14) are fragmentary elevational views illustrating the construction and mode of operation of a novel hold-down attachment which is applied to the distal ends of the front and rear folding fingers of the wrapping machine and especially adapted for use in the wrapping of thin packages;

Fig. 46 (Sheet 15) is a side elevation of a novel pull-through device which functions to remove packages from the heat-sealing zone and to transfer the same onto the cooling bed;

Fig. 46a (Sheet 15) is a detail in section taken at line 46a—46a of Fig. 46;

Fig. 47 (Sheet 15) is a plan view of the pull-through device of Fig. 46;

Fig. 48 (Sheet 15) is an enlarged sectional view, taken at line 48—48 of Fig. 46;

Fig. 49 (Sheet 11) illustrates an alternative arrangement for driving the sheeter conveyor belt;

Fig. 50 (Sheet 16) is a plan view of the mechanical transmission and clutch mechanism;

Fig. 51 (Sheet 16) is an enlarged sectional view, taken at line 51—51 of Fig. 50, illustrating the clutch control means;

Fig. 52 (Sheet 16) is a detail of the clutch control mechanism, looking from above, as in Fig. 50;

Fig. 53 (Sheet 16) is a sectional view, taken at line 53—53 of Fig. 52;

Fig. 54 (Sheet 16) is a view corresponding to Fig. 53, but showing the clutch-tripping rolls in different positions and illustrating the manner in which the clutch-control mechanism is tripped;

Fig. 55 (Sheet 16) is a sectional view, taken at line 55—55 of Fig. 52;

Fig. 56 (Sheet 16) is a sectional view, taken at line 56—56 of Fig. 53;

Fig. 57 (Sheet 17) is a view in vertical section taken on line 57—57 of Fig. 10;

Fig. 58 (Sheet 18) is an enlarged detail in elevation of the finger frame assembly; and Fig. 59 (Sheet 18) is a detail in perspective of the release device for the ancillary propeller mechanism.

General description

The assemblage shown perspectively in Fig. 1 comprises what may be regarded as two distinct machines capable of separate and independent operation, but mechanically interconnected and co-ordinated to operate in predetermined timed relation, thereby constituting, in effect, a single machine. One major part of the assemblage is known as a "sheeter" or "sheeting machine" and is identified as a whole by the reference letter "A," while the other major part is known as a "wrapping and sealing machine" or, more briefly, as a "wrapping machine," and is identified as a whole by the reference letter "B." The machine is semi-automatic, as distinguished from fully-automatic, in that one step in the wrapping operation is performed manually by the operator of the machine. Being semi-automatic, it is less costly to build than a comparable fully automatic machine, and better adapted for quick change-overs to accommodate variously sized articles; and for that reason it is more economical than a fully automatic machine where certain conditions prevail which render fully-automatic operation unwarranted. This is especially true when the machine is to be employed for wrapping articles of various shapes and sizes, and where the required output of any one article is not large enough to keep a fully-automatic machine in more or less continuous operation for relatively long periods.

The function of the sheeter A is to feed out and cut off sheets of wrapping material of pre-determined size, suited to the article to be wrapped, and to deliver the same to a position within convenient reach of the operator. The two machines, that is to say the sheeter and wrapping machine, are so co-ordinated that a single sheet of wrapping material is cut off and delivered to the operator preliminarily to the commencement of each cycle of operation of the wrapping machine. The wrapping material usually is moisture proof, susceptible of being heat-sealed; but the machine is adaptable for use with non-heat-sealing cellophane or with wrapping paper of other kinds.

The first step in the wrapping operation (referred to herein as the "banding" operation) is a manual one in that the operator picks up an article to be wrapped, places the same on a sheet of wrapping material and folds the sheet around the article, and then picks up the article, together with the sheet of wrapping material folded or banded therearound, and turns the same upside down and places it in position on the track of the wrapping machine. The wrapping machine, and likewise the sheeter, is at rest when the partially wrapped or banded article is put in place thereon. At this point two sets of stationary fingers forming component parts of the wrapping machine perform the initial end-folding operation purely as a result of the banded article being placed on the wrapping machine track.

As soon as a banded article has been positioned on the wrapping machine track, the operator trips the clutch-control mechanism by means of a foot-operated treadle or hand lever, thereby causing the entire machine, including the sheeter, to be power driven through one complete cycle of operation; whereupon, the wrapping machine functions to complete the folding operations on the two ends of the package, and also performs the necessary heat-sealing operations, while at the same time the sheeter cuts off and pays out another sheet of wrapping material preparatory to the succeeding cycle of operations.

Since the paying out and cutting off of the wrapping material inherently precedes the wrapping and sealing operations, as respects any given package, it is believed preferable to present a description of the sheeter and the novel features thereof before describing the wrapping machine per se; but it should be pointed out that the power for operating the sheeter, as well as the wrapping machine, is provided by an electric motor 10 which is mounted on the wrapping machine and connected through certain transmission means C, later to be described, to a rocker shaft 12 forming an integral part of the wrapping machine but serving as a common drive-shaft for both the wrapping machine and the sheeter. If it should be desired to utilize the sheeter independently of the wrapping machine, it would be necessary to provide the sheeter with a shaft corresponding to the rocker shaft 12, and with a motor and transmission and certain other parts which in the illustrated assemblage serve both the sheeter and the wrapping machine.

The sheeter and novel features appertaining thereto

The sheeter A comprises a frame 15 of tubular construction, equipped, preferably, with casters 16, and has a table 17 on which each successive sheet of wrapping material 14 (see Fig. 8) is placed preliminarily to the first step in the wrapping operation. This first step is known as the "banding" operation and consists in placing the article 11 to be wrapped (see Fig. 5) on the sheet of wrapping material 14, suitably centered, and then manually folding the sheet 14 around the article 11, as clearly illustrated in Fig. 15.

The sheeter depicted in Fig. 1 includes a second table 18 on which articles to be wrapped may be stored for the convenience of the operator. Immediately below this table is a belt conveyor 19 onto which the sheets of wrapping material are delivered from the cutting-off shear, one at a time, and from which the sheets are transferred manually to the sheeter table 17. The cutting-off shear and other mechanical parts of the sheeter are not shown in Fig. 1, but are adequately illustrated in other figures of the drawings to which reference presently will be made.

In the plan view of Fig. 4 the article table 18 has been omitted in order to show more clearly the belt conveyor 19 which, as will be seen, comprises a considerable number of narrow, laterally spaced parallel belts 20 passing around rollers 21 and 22, one of which is driven intermittently for the purpose of causing the conveyor belts to advance a predetermined distance and thereby effect transfer of a cut-off sheet of wrapping material from the output side of a power-driven cutting-off shear 23 to a position within reach of the operator who stands or sits at the location labeled "Operators Station" in Fig. 4. A roll 25 of sheet wrapping material, such as cellophane (see Figs. 5 and 49) is mounted on the sheeter frame; and the web of wrapping material is fed from this roll and between a pair of feed and pressure rollers 26 and 27 into and through the gap of the shear 23 and thence onto the conveyor 19.

We will not further describe the specific sheeter shown in Figs. 1 and 4 because the novel features of the invention pertaining to sheeter improvements are elsewhere illustrated; it will be more expeditious to describe the whole sheeter mechanism with reference to those views in which we have incorporated the novel features. It may be mentioned at this point that the showing of a prior art sheeter in Figs. 1 and 4 serves a useful purpose in that it provides a basis for comparison in connection with the ensuing description of the sheeter improvements which we have effected.

In Figs. 5 and 6 there is illustrated a modification, in accordance with our invention, of the sheeter A of Figs. 1 and 4, together with a showing of the sheeter drive mechanism, which latter showing is applicable to both the prior art sheeter and the present improved sheeter. Here the frame of the sheeter is identified, as before, by the reference numeral 15. The major difference between the sheeter of Figs. 5 and 6 and that of Figs. 1 and 4 is that the belt conveyor 19' is extended lengthwise so that it is substantially coterminous at the left-hand end with the corresponding end of the sheeter table 17—compare Figs. 4 and 6.

When using a well known sheeter, such as that of Figs. 1 and 4, the banding operation is performed on the table 17 and the operator must reach for and pull forwardly from the conveyor 19 a sheet of wrapping material and place the same at a convenient position before undertaking to perform the banding operation. But with the extended conveyor 19' of Figs 5 and 6, each sheet of wrapping material can be moved by the conveyor to a position which has been determined in advance to be most convenient for the operator, thereby making it unnecessary for the operator to reach for a sheet preliminarily to each banding operation. This results in a very considerable saving of time and effort, and thus increases the potential output of each machine and operator.

A still further improvement of the sheeter, and one which is directly related to that just described, is illustrated in Figs. 7 and 8, as well as Fig. 6; but it is thought best to complete the description of the sheeter of Fig. 5 before taking up the refinement depicted in Figs. 7 and 8.

Referring more particularly to Figs. 5 and 6, it will be seen that the web 25a of cellophane or other sheet wrapping material is drawn from the roll 25 and then passes around a guide roll 28 and thence upwardly and over a feed roller or group of feed rollers 26, above which, and in contact with the web 25a, is the pressure roller, or group of pressure rollers 27. The feed roller 26 is mounted on a shaft 30 to the near end of which is secured the driven portions of a free wheeling clutch 31 (see Fig. 4). The driving member of this clutch is provided with a pinion 32, concentric with the shaft 30 and continuously meshed with the teeth of a rack 33 one end of which is pivotally connected at 34 to a fitting 35 mounted on a rocker arm 36. The fitting 35 is adjustably movable lengthwise of the rocker arm 36, and may be secured in any position by means of a clamp screw 38. The rocker arm 36 is a part of the wrapping machine and is mounted on the rocker shaft 12 which also is a part of the wrapping machine. This rocker shaft is shown sectionally in Fig. 5.

The rocker arm 36 is oscillated by the rocker shaft 12 through an acute angle and is thus effective to reciprocate the rack 33. It is shown at one extremity of its travel. Each stroke of the rack 33 in the direction indicated by the arrow adjacent thereto in Fig. 5 is effective to rotate the feed roller 26 in the direction which will cause the web 25a of wrapping material to be fed a predetermined distance through the shear 23, thus positioning a predetermined length of the web on the belt conveyor 19', in readiness to be cut off by the shear 23. At the same time, the previously cut sheet of wrapping material is advanced by the conveyor 19' either to an intermediate position or to the banding position, at which there is shown (see Fig. 5) an article 11 of rectangular form—said article having been placed and centered by the operator on a sheet of wrapping material located at the banding position. Whether the sheet of wrapping material is advanced to the banding position in one or two or more steps is dependent upon the size of the sheet, and is determined by adjusting the travel of the conveyor belt, per step, as will presently be explained.

The roller 21 (Figs. 5 and 6) is secured to a shaft 40 journaled in bearing brackets 41, 41 attached to the end of the table 17; and the driven member of a free-wheeling clutch 42 is keyed to the shaft 40 and rotatable therewith. The driving member of this clutch is provided with a pinion 43 which may form a component part thereof and this pinion is meshed with the teeth of a rack 44 one end of which is pivotally connected at 46 to a fitting 47 which may be a replica of the fitting 35 previously described. The fitting 47 is slidably adjustable lengthwise of and carried by the rocker arm 36, and is equipped with a clamp screw 48 whereby it may be secured in any position of adjustment.

It will be clear that when the rocker arm 36 oscillates clockwise, as viewed in Fig. 5, it moves the rack 44 in the direction which is effective to rotate the pinion 43 counterclockwise, thereby advancing the conveyor 19' a predetermined distance which is variable and in correspondence with the setting of the fitting 47 lengthwise of the rocker arm 36. During each return stroke of the rocker arm 36, the pinion 43 is rotated clockwise, together with the driving member of the clutch 42 (see Fig. 5) but the shaft 40 and roller 21 remain at rest because this clutch is effective only in one direction.

The shear 23 includes a stationary blade 50 and a vertically reciprocable blade 51 which is hinged at one end and connected at the other end to a vertical rod 52 the lower end of which is pivotally connected at 53 (see Fig. 5) to an arm 54 fulcrumed at 56 and biased upwardly by a coil spring 57. The arm 54 is provided with a cam 58 which is engaged by a cam roller 59 attached to the lower end of the rocker arm 36. When the rocker shaft 12 and the rocker arm 36 rotate in the counterclockwise direction, the roller 59 presses against the sloping surface 58a of the cam 58 and thus forces the arm 54 downwardly about the fulcrum 56 thereby actuating the movable shear blade 51. The shearing operation is thus performed while the web 25a is at rest, it being remembered that the feed roller 26 is not driven during the counterclockwise movements of the rocker arm 36 which is equally true as respects the conveyor driving roller 21 and its shaft 40.

When the shaft 12 and the rocker arm 36 are oscillated clockwise, the roller 59 passes through a gated slot in the cam 58 and is consequently ineffective to depress the arm 46; hence, the shear remains at rest while the web of wrapping material is being advanced therethrough.

One of the novel features of this invention consists in the provision of the above-described belt conveyor 19' (see Figs. 5 and 6) which is greatly lengthened as compared with the prior art conveyor 19 (Figs. 1 and 4) and which, therefore, is adapted to convey each cut sheet of wrapping material to a point immediately adjacent the operator's station, thus eliminating the time lag incident to reaching for the sheets and placing them at a position on the table 17 whereat the banding operation can conveniently be performed. The small saving of time resultantly effected, per package, amounts to a very consequential percentage of the total operating time per cycle and, therefore, materially increases each operator's potential output.

The banding trough

A novel supplemental feature which may advantageously be applied to the sheeter of Fig. 5 is illustrated in Figs. 6, 7 and 8, and is designed to expedite the manual banding operation portrayed in Fig. 15. As most clearly shown in Fig. 8, two strips or cleats 61, 61 are secured to the top surface of the table 17 by means of bolts 62 provided with wing nuts 63; and the table is provided with transversely extending slots 64, 64 through which these bolts extend. It will be apparent that by loosening the wing nuts 63, the strips or cleats 61 may independently be moved bodily crosswise of the table 17, thereby altering the lateral distance between them; and since the conveyor is made up of numerous narrow belts 20, a comparatively small lateral displacement of either one of the strips will result in adding or substracting one of the belts 20 to or from the space between the strips. In Fig. 8 there is shown a group of fourteen belts 20 of which six are situated between the strips 61, four are located above these strips and superimposed thereon, and the remaining four are disposed at the outer sides of the strips. The conveyor shown has a total of thirty-two belts (see Fig. 6) only fourteen of which are shown in Fig. 8. The strip adjustment thus depicted is sufficient to freely clear an article 11 which is shown in position between the strips 61 and resting on a sheet of wrapping material 14 cut to a prescribed length by the shear 23 and advanced by the conveyor to a convenient position immediately adjacent the operator's station, such as that indicated in Fig. 7. When the operator places an article 11 on a sheet of wrapping material 14, he positions it between the two strips 61, thereby pushing the sheet 14 down into the space between the two strips, and causing the free ends of the sheet to be deflected upwardly, as clearly illustrated in Fig. 8. The operator then is able quickly to place his hands under the elevated free ends of the sheet and flip these free ends over the article 11 into overlapped relation, as depicted in Fig. 15. This greatly expedites the manual banding operation by making it possible for the operator to place his hands underneath the sheet quickly and without interference. Obviously, the strips 61 can be moved closer together to accommodate articles of less width, or farther apart to accommodate articles of greater width.

It will be observed that the supplemental feature illustrated in Figs. 7 and 8 are described above is a highly desirable but not indispensable addition to the improved sheeter of Fig. 5 hereinbefore described.

The alternative conveyor drive of Fig. 49

An alternative arrangement for driving the sheeter conveyor is illustrated in Fig. 49 (Sheet 11) wherein the several conveyor belts 20 pass around the rollers 65 and 66, the latter of which is mounted on a shaft 67 having a pinion 69 which is meshed with an idler gear 70 rotatably supported on a stud 71 which is secured to an arm 72 fulcrumed on the shaft 73 and having a quadrant portion 74 provided with an arcuate slot 75 through which extends a clamping screw 76 secured to the frame. The feed roller 26 over which passes the web 25a of wrapping material is secured to the shaft 73 together with a spur gear 78, which latter is meshed with the idler gear 70. The pinion 32 (see Figs. 5, 6, and 7) is secured to the shaft 73 through the medium of a free-wheeling clutch and is driven by the rack 63 in the manner previously described with reference to Fig. 5.

It will be apparent that the conveyor belts 20 are moved in the direction indicated by the arrow, Fig. 49, in unison with each forward movement of the web 25a through the shear 23; and it will further be apparent that the lineal speed of the conveyor belt, relative to the peripheral speed of the feed roller 26, is dependent upon the ratio between the gear 78 and the pinion 69 of the gear train. The pinion 69 preferably is replaceable by larger and smaller pinions, as required, and the stud 71 in such event is so secured to the arm 72 that the center-to-center distance between the stud and the shaft 73 may be adjusted to properly mesh the gears. To that end the arm 72 may be provided with a slot 79 along which the stud 71 is adjustably movable. Upon loosening the clamping screw 76, the arm 74 can be rotated about the shaft 73 so as properly to mesh the idler gear 70 with the pinion 69 irrespective of the size of the idler gear 70 or of the pinion 69. By appropriate gear ratio selection, the conveyor can be made to advance any desirable distance per cycle of operation, and this distance may be equal to or any multiple of the length of one sheet of wrapping material. Each sheet, in turn, may thus be brought to a predetermined convenient position for performance of the banding operation.

The wrapping and sealing machine, per se

The wrapping and sealing machine B comprises a structural steel frame 80 of generally rectangular outline, including four supporting legs 81 provided at their lower extremities with casters 82. It will be evident that the entire machine, including the sheeter, can easily be rolled from place to place within a building, pursuant to momentary requirements.

The previously mentioned driving motor 10 is connected through a belt 83 (see Fig. 2) to a pulley 84 forming a component part of the transmission C. This pulley is keyed to a countershaft 85 to which is secured a pinion 86 meshed with a spur gear 87. The latter rotates continuously, as long as the motor 10 is energized, but its effectiveness to transmit power and thus drive the machine is controlled by a clutch 89 forming a part of the transmission C (see Figs. 50 and 51) and adapted to be engaged, through a manual control, to start the machine on a cycle of operation, and thereafter to be automatically disengaged following one complete revolution of the gear 87. The clutch and clutch-control mechanism are illustrated in detail in Figs. 50–56, and will be described later. The manual control for tripping the clutch and thereby setting the machine into operation, as shown in Fig. 1, is of a dual nature; it includes a hand-operated lever in the form of a U-shaped bar 90 and a foot-operated treadle 91, either of which, individually, may be used to start the machine, as the operator may prefer. The treadle 91 need not always be provided, and it is omitted from the showings of Figs. 2 and 10. It is simply an alternate means of starting the machine. The ends of the U-shaped lever 90 (Fig. 1) are welded to a rotatable tube 92 that is mounted on a cross-shaft 93; and the treadle 91 is connected to this tube through a rod or cable 94 the upper end of which is connected to the distal end of an arm 95 which also is secured to the tube 92. This tube is provided with a laterally extending arm 96 (Fig. 2) which connects with the upper end of a link 97 (see Figs. 2, 50 and 51) the lower end of which is connected to an arm 103 that is shown also in Figs. 50 and 51. The machine is started on a cycle of operation by pressing downwardly on the lever 90 or treadle 91, thereby lifting the link 97 which causes the members of the clutch 89 to become interengaged. Further description of the clutch-control and transmission mechanism will be deferred, it being sufficient for the moment to have pointed out the manual controls and to have made clear that each cycle of operation involves one complete revolution of the crank 102.

A rocker arm 98 (see Figs. 1 and 2) secured to the rocker shaft 12 and disposed parallel to the previously described rocker arm 36 (Fig. 5), is provided with a curved slot 99 in which is positioned a roller 100 mounted on a crank pin 101 (Fig. 51) secured to the distal end of a crank arm 102 attached to the driven member of the clutch 89. It should now be clear that when the clutch 89 is engaged the crank arm 102 will make one revolution about the axis of the gear 87, causing the roller 100 to revolve through a circular orbit, and that, as a result, the rocker arm 98 will be oscillated through a definite acute angle, first clock-wise from the "at rest" position in which it is shown in Figs. 1 and 2, to an alternate limiting position (not illustrated) and then counterclockwise, to the starting position, whereupon it again comes to rest as a result of the clutch 89 being automatically disengaged. And it will be obvious that the rocker arm 36 is similarly oscillated as is also the rocker shaft 12 to which both rocker arms are secured.

The rocker arm 98 carries a cam roller 104 (Figs. 2 and 2a) which bears against the under surface of a lever 105, fulcrumed at 106 on the frame of the machine, and is effective during the initial portion of each clockwise rotation of said rocker arm (Fig. 2) to rotate the lever 105 through a small angle, about its fulcrum 106, in the clockwise direction. During the remainder of each clockwise movement of the rocker arm 98, the lever 105 remains at rest in its elevated position because the roller 104 continuously engages an arcuate surface 107 on said lever, the center of curvature of which surface coincides with the axial center of the rocker shaft 12.

The distal end of the lever 105 is pivotally connected to the link 108 which, in turn, is pivotally connected at 109 to a casting 110 forming the external arm of a lever 112, which lever has also a long inwardly extending arm which is concealed from view in Figs. 1 and 2, but is shown in Figs. 11 and 57 and is substantially a counterpart of a lever 116 that is shown in Figs. 11-14. The two levers 112 and 116 are keyed to opposite ends of the cross-shaft 93 (which shaft extends through the tube 92, Fig. 1) and are referred to herein as "wing-pull-down levers."

The external arm 110 of the lever 112 is connected to a coil spring 118 the lower end of which is anchored to the frame of the machine. This spring, acting through the lever 112, serves to bias both the wing-pull-down levers 112 and 116, as well as the cross-shaft 93, in the counterclockwise direction as viewed in Figs. 2 and 11; and at the same time it biases downwardly the distal end of the lever 105 by virtue of the interconnecting link 108. The external arm of the lever 116, as best shown in Fig. 11, is pivotally attached to the piston rod 119 of a dashpot which includes the cylinder 120. The function of this dashpot is to prevent the wing-pull-down levers 112 and 116 from retracting too abruptly under the impetus of the spring 118.

At the top of the frame 80, and supported thereon, is a horizontal track comprising two parallel rails 121 and 121' (see especially Figs. 3 and 6) consisting usually of angle irons, suitably modified. These rails constitute the supports on which the articles being wrapped are mounted during the mechanical wrapping operations; and the rail 121' is adjustably movable laterally, together with numerous other parts of the machine, so as to vary the distance between the rails, or thereacross, in conformity with the lengths of the articles to be wrapped. One or more horizontal bars 122 (see Fig. 6) may be interposed between the rails 121 and 121' to provide an intermediate support for the packages in process. These extend parallel to the rails and have upper surfaces in the same plane as the upper rail surfaces.

A banded article of rectangular form in process of being wrapped, corresponding generally to Fig. 15 and identified, as before, by the reference numeral 11, is indicated in dot-dash outline in Figs. 2 and 11. The article so indicated spans and rests upon the two rails 121 and 121' (and also upon the bar or bars 122, if the article is long enough or so limber as to require such intermediate support) at what is referred to herein as the "loading position" or "loading station." The outside-to-outside distance across said rails is approximately equal to the length of the article, it being understood that an adjustment of the machine has previously been made to bring about that condition.

The article 11, with the wrapper 14 banded therearound, is placed on the track by the operator, following the manual banding operation exemplified in Fig. 15 and previously described. In placing a banded article on the track, the operator turns it upside down, as distinguished from Fig. 15, so that the lengthwise overlap of the wrapper is adjacent the track; and he places the banded article on the track so that its lengthwise dimension is transverse of the track. Consequently, the projecting ends of the wrapper 14 tend to project laterally beyond the outside edges of the two rails; and it is necessary that they do so in order to enable the end-folding operations to be performed, as hereinafter described.

Embedded in each of the two rails 121 and 121' is an electrically heated sealing iron 123 which contacts the overlap of the wrapper and, where heat-sealing cellophane is employed as the wrapping material, serves to effect two bonds between the overlapped portions of the wrapper so that they are locked together as a preliminary to the ensuing end-folding operations.

Situated at the outside of and immediately adjacent each rail 121 and 121' is a set of stationary fingers. There are two such sets of fingers, one at each end of the article 11, and each set comprises three fingers 124, 125 and 126, respectively. All three are mounted, in each instance, on a supporting structure 128 so that they can be moved therealong lengthwise of the track and thus spaced apart in harmony with the width of the article being wrapped. The function of stationary fingers 124—126 is to fold upwardly the bottom end flaps of the wrapper, as depicted in Fig. 16, and that function is effected purely as an incident to placement of the banded article on the track at the loading position by the operator, the stationary fingers being so placed, lengthwise of the track, that they will symmetrically engage and fold upwardly the bottom end flaps of the wrapper while the banded article is being placed in position on the track.

The next mechanical operation which is performed immediately upon the machine being put into operation by engaging the clutch, consists in folding in the side or vertical end flaps of the wrapper at both ends of the article, as depicted in Fig. 17; and this is accomplished at both ends, simultaneously, by means, in each instance, of a pair of movable folding fingers 129 and 130, known, respectively, as the front and rear folding fingers. These movable fingers 129 and 130 are carried, respectively, by the adjacent stationary fingers 124 and 126 on which they are fulcrumed, individually, at 129a and 130a (see Fig. 11). In Figs. 2 and 11 they are shown in their normal or "at rest" positions, which they occupy while a banded article is being placed on the track, and, therefore, immediately prior to the tripping of the clutch-control mechanism which starts the machine on a cycle of operation.

Integral with each front folding finger 129 is an arm 131 the free end of which is connected through the medium of a coil tension spring 132 to a lug 133 attached to a bar 134 interconnecting the distal ends of the two long arms of the wing-pull-down levers 112 and 116. This is depicted most clearly in Fig. 11 which shows a fragment of the long arm of the lever 112, together with the lever 116 situated in the background. When the two wing-pull-down levers are rotated clockwise from the posture which they assume in Fig. 11, to that in which they are displayed in Fig. 12—such being the action which takes place at the outset of each cycle of operation of the machine—tension is applied to the spring 132, thereby rotating the front folding finger 129 about its fulcrum 129a in the clockwise direction, as will be apparent upon comparing Figs. 11 and 12. And at the same time the rear folding finger 130 is rotated about its fulcrum 130a in the counterclockwise direction. Thus, the two fingers 129 and 130 move toward each other concurrently, and thereby perform the side folding operation illustrated in Fig. 17.

Actuation of the rear folding finger 130 is accomplished by means of a rocker bar 136 which, as best shown in Figs. 3 and 58, is connected at its two ends to links 137 which are fulcrumed at 138 on supporting brackets 139. It will be evident that the rocker bar 136 is capable of vertical movement in an arcuate path having its center at 138. A pin 140 carried by the front folding finger 129 extends underneath and forms a support for the rocker bar 136 and is so positioned that when the finger 129 is rotated clockwise (Fig. 11) the rocker bar is lifted by said pin; and a second pin 141 carried by the rear folding finger 130 is positioned above and resting upon the rocker bar 136 (Fig. 3) so that when the latter is pushed upwardly it causes the rear folding finger 130 to rotate counterclockwise. A restoring spring 143 is connected to the rear folding finger 130 and biases the same clockwise, thus serving to return the rear folding finger 130 to its normal posture when downward pressure on the rocker bar 136 is released. This occurs when tension on the spring 132 is relieved by restoration of the wing-pull-down levers to their normal postures—which latter event does not take place until the lever 105 is restored to normal during the final portion of the return stroke of the rocker arm 98.

The next and final phase of the folding operation consists in folding down the top end flaps of the wrapper at both ends of the article, as depicted in Fig. 18; and this is performed by means of two laterally spaced, vertically postured parallel plates 144, 144, known as top folding wings, which, in the present case, are supplemented by hinged depending extensions 145, 145 referred to herein as underlapping-wing-flaps. When wrapping relatively thick packages such as that shown in Fig. 18, the underlapping-wing-flaps 145 function as if they were integral parts of the plates 144, and they could be such if the uses of the machine were to be limited to packages thick enough to require no underlapping; but when thin packages are to be wrapped, such as that illustrated in Fig. 19, it is necessary to actuate the wing flaps 145, and in such cases they do not function merely as supplementary or integral parts of the plates 144. For the time being, we will disregard the wing flaps, as such, and proceed to describe the construction and operation of the top-folding-wing units each of which is identified as a whole by the reference letter D.

The top-folding-wing plates 144, including the hinged flaps 145, are located in each instance in the same vertical plane as the respectively associated folding fingers 124—126, at either side of the track, and they are adapted to be moved downwardly to engage the horizontally projecting top end flaps of the wrapper (Fig. 17) and to fold the same downwardly, as per Fig. 18, immediately after the side end flap folding operation has been completed by the front and rear folding fingers 129 and 130, in the manner previously described.

The top-folding-wing plates 144 are each provided with two or more horizontally projecting studs 146 (Fig. 9), each of which passes through a compression coil spring 147 and thence through a rigid vertical supporting plate 148; and each stud is provided with a nut 150 at the outer side of the associated supporting plate 148, serving as a stop to resist the expansive force of said springs. The plates 144 are supported by the studs 146 and thus, indirectly, by the plates 148; and they are free to move outwardly to a limited extent against the pressure of the springs 147. Accordingly, they are capable of yielding horizontally, whenever necessary, upon engaging the ends of the package.

Each of the supporting plates 148 is pivotally connected at 151 and 152 (see Fig. 11) to parallel links 153 and 154 the lower ends of which are pivoted at points 155 and 156 on supporting arms of a casting 158, the center-to-center spacing of the pivots 155 and 156 being identical with that of the pivots 151 and 152. Due to the fact that the links 153 and 154 are parallel (the curvature of the link 153 being of no significance in this respect), the top-folding-wing units D maintain their same postures constantly, as may be observed by comparing Figs. 11, 12 and 13 wherein one of the units D is shown in three consecutive positions. Hence, the lower horizontal edges of the top-folding-wing plates (i. e., the lower edges of the underlapping-wing-flaps 145) are brought uniformly into contact with the top end-flaps of the wrapper, and thus are able to effect a smooth and uniform down-folding operation.

Each of the two top-folding-wing units D is connected to the bar 134 through the medium, in each instance, of a link 159. These are pivotally connected at their respective upper ends to brackets 160 welded to the links 154 and projecting laterally therefrom. Each link 159 serves to actuate one of the two top-folding-wing units D in response to the up and down movements of the bar 134 that is carried by the two wing-pull-down levers 112 and 116.

Manifestly, the top-folding-wing units start their downward movement from the elevated position of Fig. 11 at the outset of each cycle of operation of the machine and simultaneously with the previously described movement of the front and rear folding fingers 129 and 130. But the top-folding-wing units are not sufficiently depressed to become effective until after said front and rear folding fingers have completed their folding operations. This is illustrated in Fig. 13 wherein the fingers 129 and 130 have completed their flap-folding movements while the units D are still at too high an elevation to engage the top end-flaps of the wrapper.

When the top-folding-wing units D have descended, during each cycle of operation, to the point where the lower edges of the flaps 145 make contact with the respective top end-flaps of the wrapper and are thus about to start the top folding operation, it is necessary that the folding fingers 124—126, 129 and 130 start descending and continue descending, in order to clear the way for the operation of the top-folding-wings; and the descent of these fingers is accomplished by mechanism comprising a chain 161 connected at one end to the bar 134 and at the other end to a cross-bar 162, which latter bridges two corresponding ends of a pair of spaced arms 163, 163, both of which are secured through the medium of lateral extensions 164 to a cross-shaft 165 (see Fig. 11) the axis of which is the center of rotation of the two arms 163. These arms are biased clockwise by a spring 167 so that the cross-bar 162 is normally urged upwardly.

The cross-bar 162 passes through slots 168 in a pair of stirrups 169 welded, individually, to a pair of tubular sleeves 170 each of which is slidable vertically on one of a pair of laterally spaced guide rods 171. The finger-supporting structures 128 are each rigidly secured, as by welding, to one of the sleeves 170, individually, and are bodily reciprocable therewith, vertically. The two sleeves 170 and their respectively associated finger-supporting structures 128, together with the fingers carried thereby, are movable bodily up and down, in unison, in response to movements of the arms 163 and cross-bars 162; and both units, so defined, move simultaneously.

As depicted in Fig. 11, the chain 161 normally is slack. Consequently, during the initial portion of each clockwise movement of wing-pull-down levers 112 and 116, the folding fingers continue to be held in their uppermost positions by the spring 167. But as soon as the levers 112 and 116 have rotated sufficiently to take the slack out of the chain 161, the latter will impart a downward force to the cross-bar 162 against the opposing tension of the spring 167 and thus will cause the finger-supporting structure 128, together with the fingers themselves, to move downwardly at the same rate, or approximately so, as the top folding unit D.

A manually adjustable stop 166 in the form of a set screw (see Fig. 57) is carried by the frame and engages the arm 163 to fix the upper limit of travel of the finger-supporting structures 128, in harmony with the height of the article-to-be-wrapped. The stop 166 thus determines the elevation of the upper extremities of the folding fingers above the top surfaces of the rails 121 and 121'. The adjustment is so made, in each case, that the tops of the folding fingers are normally at an elevation slightly below the top surface of the article.

Mounted individually on each of the rails 121 and 121', and normally situated at the ends thereof adjacent the operator's station, are two identical pusher carriages 172, 172, details of which are shown in Figs. 20–22. Each pusher carriage comprises a body casting 174, two side plates 175, 175, two rollers 176, 176 journaled in said side plates, a pusher plate 177 secured to the body casting, and an adjustable stop screw 178. The lower margins of the two side plates 175 are flanged inwardly (Fig. 21) for the purpose of anchoring the carriages to the rails. The rollers 176 rest on the rails and support the weight of the body castings and other parts. A link 179 having an elongate, lengthwise-extending slot 180 is pivotally connected at one end to the rear of each pusher carriage by means of a pin 181 secured at its two extremities to the side plates 175.

The two pusher carriages are adapted to advance in unison along the two rails, and they serve, conjointly, to push the packages 13 lengthwise of the track from the loading station thereon to a rearward position wherein the packages come to rest on an electrically heated bottom hot plate 182. In Fig. 20 the package 13 and the pusher carriage 172 are shown in full lines at the starting position, and in dot-dash lines at an advanced position wherein the package is about to move onto the bottom hot plate where it will come to rest—the pusher carriages being thereafter retracted to the starting point. While the package is being advanced along the track, the top-folding-wing units D, as well as the folding fingers, remain in their depressed positions, as depicted in Fig. 14, wherein one of the pusher carriages 172 is shown in its most advanced position. Thus, the plates 144 serve continuously to hold the folded end flaps of the wrapper in place while the package is being advanced along the track and before the folded end flaps have been heat-sealed.

Two vertical electrically-heated hot plates 183 and 184 are positioned to engage the two folded ends of the wrapper while the package is resting on the bottom hot plate 182. All wrapper overlaps, both at the bottom and ends of the package, are, consequently, heat-sealed while the package rests on the bottom hot plate; and this operation continues either until a subsequent package pushes it off the bottom hot plate onto a cooling bed 186 or until it is removed manually by the operator, in event of there being no immediately subsequent package.

Bridged between and connected to the upper ends of the two rocker arms 36 and 98 is a pusher bar 185. This extends through the slots 180 in the two pusher carriage links 179 (see Fig. 9), and its primary function is to propel the two pusher carriages lengthwise of the track, and thereafter to retract the same. A secondary function of the pusher bar is to anchor the pusher carriages in their retracted positions against the stops 189 (Figs. 9 and 11) so that these carriages cannot inadvertently be displaced by the operator.

The pusher bar 185 starts its forward excursion along the arcuate path indicated in Fig. 20 at the very beginning of each cycle of operation of the machine; but it is necessary to delay the forward movement of the pusher carriages until the end-folding operations have been completed and the folding fingers are down and thus clear of the package, as illustrated in Figs. 13 and 14. This delay is achieved by means of the links 179 which, being pivoted at 181, will rise with the forward movement of the pusher bar, as may be seen by comparing Figs. 12 and 13, and will rotate about their pivotal centers without advancing the pusher carriages, until the links 179 come into contact with their associated stop screws 178. When that happens the links 179 proceed to behave as positive coupling mediums between the pusher bar 185 and the two pusher carriages; and, thereupon, the pusher carriages move forwardly with the pusher bar, as illustrated in Figs. 14 and 20.

Upon completion of each forward movement of the pusher bar 185, its direction is reversed, and in response to the ensuing return movement thereof the pusher carriages are retracted to their starting points, whereupon the machine is automatically stopped by a clutch-control mechanism which will later be described.

It will be noted that the pusher carriages 172 are permanently tied to the pusher bar 185 by the links 179, wherefore it is not possible to displace the pusher carriages from their idle or starting positions, as per Fig. 11, except by starting the machine. And what is more, when the machine is at rest and thus ready for loading, the links 179 are so postured that they cannot obstruct or hinder manual placement of a banded article on the track at the loading station. This is well illustrated in Fig. 9. With the pusher carriage coupling means previously employed, the carriages were not anchored to the pusher bar, or otherwise, when in idle position, and, therefore, could be fortuitously displaced forwardly of the track; and this has sometimes led to unfortunate results. Moreover, the prior art couplings which are superseded by the links 179 involved the use of hook-like members projecting upwardly from the pusher carriages and adapted to be engaged by the pusher bar following a predetermined delay. Such hook-like members were at all times in upright posture and inherently constituted impediments to the placement of banded articles on the track. The links 179 are, accordingly, a notable improvement over the prior art arrangement.

The previously mentioned cooling bed 186 is constructed preferably of lengthwise-extending laterally spaced bars, and is designed to facilitate rapid dissipation of heat from the completed packages; and spaced laterally of this cooling bed and overlying the same in alignment, respectively, with the vertical hot plates 183 and 184 are two vertical grids 187 and 188 consisting of vertically spaced bars and designed to facilitate cooling of the folded ends of the packages.

The machine ordinarily is operated so rapidly that each package resting on the bottom hot plate 182, between the vertical hot plates 183 and 184, is quickly pushed by the next succeeding package onto the cooling bed, and thus is not subjected to the heat-sealing temperature long enough to injure the cellophane or the contents of the package.

During the initial and major part of each return stroke of rocker arm 98, the lever 105 is held in elevated posture by the roller 104 which underlies and engages the arcuate surface 107, and consequently the top folding units D, as well as the folding fingers, are held in their depressed positions for the greater part of the time that the pusher carriages 172 are being retracted. But this delay in restoring the units D and the folding fingers to their normal positions is merely incidental and of no practical significance.

As soon as the rocker arm 98 has so far completed its counterclockwise movement (Fig. 2) as to enable the lever 105 to escape restraint of the roller 104, this lever rotates counterclockwise through a small angle and is followed by wing-pull-down levers 112 and 116, acting under the impetus of the spring 118. This restores the units D to their normal elevated positions and allows the folding fingers to be elevated by the spring 167.

The dashpot 120 prevents the units D from rising too rapidly, thus obviating a good deal of noise, as well as wear and tear on the machinery; and a similar dashpot 190 connected to one of the arms 163 has a like restraining effect on the upward movement of the folding fingers and their supporting structures 128.

Pivotally connected to the rear end of the cooling bed 186 is an extension table or platform 191 (Fig. 2), normally held in horizontal posture by a diagonal knee brace 191a and adapted to fold down when not in use. Said extension table serves to receive and temporarily hold a number of finished packages pending removal by an attendant.

In order to accommodate packages of diverse lengths, it is necessary that the lateral spacing of the rails 121 and 121' be adjustably variable. Hence, it is essential that one of said rails be laterally movable. And it is further necessary that various components associated with the movable rail be also movable therewith. The movable rail is the one nearest the observer in Figs. 4 and 6, and is identified by the reference numeral 121'. The top-folding unit D associated with the rail 121' and the associated folding fingers, together with their supporting structure 128, as well as the associated casting 158, sleeve 170, guide rod 171, pusher carriage 172, link 179, heating plate 184 and vertical grid 188, form with said rail 121' a self-contained unit which is movable as a whole transversely of the machine—said unit being securable in any position of adjustment by means of clamp screws 192 and 193 (see Figs. 1, 2, 9 and 57).

*Modified pusher-carriage link mechanism of Fig. 23*

A pusher-carriage drive linkage, which may be employed as an alternative or substitute for the links 179 heretofore described, is shown in Fig. 23 wherein the pusher-carriage 172 and rail 121' may be identical with those illustrated in Figs. 20–22. Instead of the single link 179 having an elongate slot 180, the linkage of Fig. 23 comprises two articulated links 194 and 195 pivoted at 196 and provided with co-operating lugs 197 and 198 which serve to prevent the pivotal center 196 from dropping to or below dead center. The link 194 is connected, as shown, to the pusher bar 185. In the full-line showing both the pusher-carriage 172 and the pusher bar 185 are in idle position, and it will be noted that the pivotal center 196 is above the line of centers interconnecting the axis of the pusher bar and the pivotal connection of the link 195 to the carriage at 199. Hence, when the pusher bar starts its forward movement from an idle position, the linkage will fold as indicated in dotted outline at the left-hand end of Fig. 23 until the link 195 encounters the stop screw 178; thereupon the pusher-carriage will start moving forwardly and will continue so to do until it reaches the limiting position in which it is shown in dot-dash outline at the right-hand end of Fig. 23.

The alternative linkage just described possesses the same advantages as does that of Figs. 20–22 in that it anchors the pusher-carriage against forward movement when in idle position and, also, that it presents no obstacle to the placement of banded articles on the track of the wrapping machine.

*Pusher-carriage with push-thru feature, as per Figs. 24–27*

Pusher-carriages of the species illustrated in Figs. 20–22 and other figures of the drawings hereinbefore described, are suitable when the product being packaged is not susceptible of being damaged as a result of being more than momentarily subjected to the relatively high temperature of the hot sealing plates; but when a product such as butter, ice cream or the like is to be packaged, it obviously is not permissible to allow the packages to be subjected to the hot plate temperature longer than is necessary to carry out the heat-sealing operation, which actually requires but a very brief exposure. Therefore, to meet those exceptional situations we have devised the pusher-carriage illustrated in Figs. 24–27, which includes what we call a push-thru mechanism, the purpose and effect of which is to move each package into and fully across the heat-sealing zone at a single stroke, so that the packages do not come to rest in said zone and, consequently, are subjected to the high temperature thereof for a period of time which is insufficient to melt or otherwise impair the product.

The pusher-carriage, here identified as a whole by reference numeral 201, is basically the same as the pusher-carriage 172 previously described, and comprises a suitable body casting 202, two side plates 203, which are inwardly flanged at their lower margins for slidable attachment to the rail 121' and two pair of rollers 204 rotatably mounted on pins 205 which are secured at their ends to the side plates 203. The pusher link 179 may be identical with that shown in Figs. 20–22, as may also the stop screw 178 and the pusher bar 185.

Each rail 121 and 121' is slotted lengthwise to receive a rack bar 206, which preferably is flush with the top surface of the rail and securely welded in place. Mounted on one of the pins 205, and positioned between the two rollers 204 thereon, is a spur pinion 208 the teeth of which are meshed with the teeth of the underlying rack 206. A second rack 209 which passes through a guide slot in the body casting 202, extends parallel to the track and has a series of teeth on its lower face which mesh continuously with those of the pinion 208. A suitable pusher plate 210 is welded to the front end of the rack 209 and adapted to engage the package 13. It will be apparent that when the carriage 201 is propelled forwardly, the pinion 208 is rotated clockwise and, as a result, propels rack 209 forwardly, together with the pusher plate 210, at such a rate that it advances, in any given time, a distance twice that of the carriage. Therefore, a forward movement of the pusher-carriage which, in itself, is sufficient only to transfer a package from the loading station onto the bottom hot plate 182, becomes effective, by virtue of the above-described push-thru feature, to move the package all the way across the hot plate and onto the cooling bed, the package remaining in contact with the hot plates only long enough to complete the sealing operation.

*The underlapping-wing-flap operating mechanism of Figs. 28—30*

When wrapping thin packages, it is desirable, if not mandatory, that the top end flaps of the wrapper be lapped under and sealed to the bottom surface of the wrapper, as illustrated in Fig. 19, instead of being merely folded down and sealed to the side and bottom end-flaps, as is done in the case of thicker packages, for example that of Fig. 18. The underlapping operation is effected by means of the hinged underlapping-wing-flaps 145, 145, to which reference has previously been made. As most clearly shown in Figs. 9 and 28, these are normally disposed in the same vertical plane as their respectively associated top-folding-wing plates 144, and are pivotally supported as at 211 on brackets 212 which, in turn, are each attached to the bottom surface of a horizontal flange 213 constituting an integral part of the plate 144.

Fig. 28 shows one of the underlapping-wing-flaps 145 in its normal vertical posture wherein it functions solely as an extension of the top-folding-wing plate 144, to fold downwardly one of the top end flaps of the wrapper. Fig. 29, on the other hand, shows the underlapping-wing-flap 145 fully rotated, through an angle of 90°, to the horizontal posture which it finally assumes upon being actuated, as hereinafter described.

The two brackets 212 at opposite ends of the unit function as bearing members for a plunger rod 214 which is movable lengthwise against the opposition of a retracting spring 215, in one direction, and returnable by said spring, in the opposite direction, upon being released.

A two-piece link 216 is pivotally connected at 217 to the plunger rod 214, and further pivotally connected at the other end to the underlapping-wing-flap, the link 216 normally lying at an acute angle to the axis of the plunger rod, as shown in Fig. 28. When the plunger rod 214 is in normal position, the link 216 permits the underlapping-wing-flap 145 to assume its vertical posture, and, in fact, anchors this wing-flap in a vertical posture so that it cannot swing in either direction except in response to the plunger rod. But when the plunger rod is depressed (Fig. 29) the resultant pressure brought to bear lengthwise against the link 216 is translated by the link into a force acting on the underlapping-wing-flap in the direction perpendicular to the axis of the plunger rod. It will be seen that the link 216 functions in the manner of and constitutes a toggle connection between the plunger rod 214 and the underlapping-wing-flap 145.

The two plunger rods are depressed to actuate the underlapping-wing-flaps 145, 145 immediately after the top folding units D have reached the limit of their downward travel; and the actuation thereof is effected by means of actuating arms 218 (see especially Figs. 11–14) which are hinged at 219 to the frame of the machine and biased by coil springs 220 toward the respective plunger rods. Each arm 218 has a laterally-projecting boss 218a positioned to engage the enlarged heat 214a of its associated plunger rod 214 when the top-folding-wing units D are in down position, as illustrated in Figs. 13 and 14. The arms 218 are held retracted by the pusher bar 185, as per Figs. 9, 11 and 12, until the top folding units D are all the way down; and the forward movement of the pusher bar 185 is so timed that the ends of the plunger rods 214 are contacted by lugs 218a immediately thereafter, and before the pusher-carriages commence their forward movement. The force exerted by the springs 220 is great enough to overcome the opposing force of the springs 215 and further sufficient to supply the energy needed to rotate the underlapping-wing-flaps 145.

*The provision for applying solvent to the end portions of the top end flaps of the wrapper, as illustrated in Figs. 31—33*

When the sheet wrapping material is non-heat-sealing cellophane or the like—for example, cellulose acetate—and the wrapper ends are to be underlapped, as hereinbefore described, it is necessary to apply a liquid solvent such as acetone to the end portions of the wrapper which are to be folded under; and there is illustrated in Figs. 31—33 an arrangement which successfully achieves that end by applying the solvent contemporaneously with the top folding operation and immediately in advance of the under-lapping operation.

As clearly shown in Figs. 32 and 33, the outer end portions of the horizontal legs of the two rails 121 and 121' have been cut away so that the thin package 13 overhangs the rails by a considerable margin at each side of the track. This is to enable the top end flaps to come immediately into contact with the bottom surface of the wrapper after the solvent has been applied in the manner presently to be explained.

Attached to each of the stationary folding fingers 125 is a receptacle 221 which is filled with a suitable solvent, such as acetone, and provided with a wick 222 projecting upwardly from the top. The top-folding-wing plates 144 and underlapping-wing-flaps 145 are the same as in Figs. 28 and 29; but the flap actuating mechanism is omitted from the showing of Figs. 32 and 33 and may be assumed to be the same as that of Figs. 28 and 29.

To each top-folding-wing plate 144 there is attached an angle bar 223 so positioned that when the top-folding-wing units D are fully depressed (see Fig. 33) these angle bars contact the top of the package and serve as hold-downs therefor, thus co-operating with the underlapping-wing-flaps 145 to squeeze the end margins of the package so as to bring the solvent-wetted surfaces of the wrapper end-flaps into intimate contact with the under surface of the wrapper.

Attached to each of the flanges 213 is a flexible pressure foot 224 of Z-shape cross-section, each having a horizontal leg 224a the free marginal portion of which is positioned to overlap and engage the top surface of the subjacent top endflap of the wrapper (see Fig. 32) as the top folding units descend. These pressure feet force the wrapper top end-flaps downwardly into contact with the adjacent wicks 222, and hold the same in contact therewith momentarily, while the underlapping-wing-flaps 145 continue their downward movement. Thereafter, the underlapping-wing-flaps engage the top end-flaps of the wrapper and start folding them downwardly, and this causes each top end-flap of the wrapper to be withdrawn from between its associated wick 222 and the pressure foot 224.

At about the same time that the underlapping-wing-flaps 145 make contact with the top end-flaps of the wrapper, the folding fingers, including the fingers 125, start moving downwardly and carry with them the solvent receptacles 221 and wicks 222. This clears the way for the underlapping-wing-flaps, and thus enables the wetted end portions of the top end-flaps to be folded under, as shown in Fig. 33. The package 13 is then moved forwardly along the track by the pusher-carriages.

*The pusher-carriage with retractable hold-down, per Figs. 34—39*

When packaging light-weight articles and materials of a bulgy nature, a better job can be done if the banded articles or material be held down on the wrapping machine track (and flattened down at the two ends, if the article or material is bulgy) while the end-folding operations are being performed. In the past it has sometimes been necessary for the operator to effect the requisite holding-down or flattening of the package by superimposing thereon a suitably weighted board, or the like, before tripping the clutch to start the machine. But such intermediate procedure manifestly diminishes the potential output of the machine and operator, besides requiring a considerable measure of caution in seeing to it that the board or other weight is positioned accurately and without displacing the banded article.

In Figs. 34-39, inclusive, there is illustrated a pusher-carriage, elementarily similar to that of Figs. 20—22, including a novel automatic hold-down mechanism designed primarily for the above-stated purpose, and comprising a hold-down shoe which is automatically superimposed upon the adjacent marginal end portion of the banded article lying on the track, preliminarily to the performance of the mechanical folding operations. It will be understood that each machine comprises two pusher-carriages, as before, and that each carriage is equipped with the automatic hold-down; and it will become apparent that the two hold-downs are counterparts, differing only in that they are of the left-hand and right-hand species, respectively. This results from the fact that the two hold-downs operate on opposite end portions of the package and must, perforce, move in opposed directions transversely of the track.

The illustrated pusher-carriage, including the appurtenant hold-down mechanism, constitutes the right-hand member of the pair, as viewed from the operator's station, and is designed for mounting on the right-hand rail 121' (see Fig. 21); and a complementary left-hand pusher-carriage including a left-hand hold-down mechanism is assumed to be mounted on the left-hand rail, but not shown. The two are reverse counterparts and are operated synchronously by the pusher bar 185, which is common to both.

The pusher-carriage, per se, identified as a whole by reference numeral 227, comprises a body casting 228 formed to accommodate the various parts attached thereto, and two vertical, laterally spaced parallel side plates 229, 229 removably secured to either side of said body casting and having inwardly projecting contraposed lower flanges 230 which engage the rail 121', as illustrated in Fig. 38, and thus serve to hold the pusher-carriage thereon, but free to move lengthwise thereof. A pair of carriage-supporting rollers 231 (Fig. 35) are disposed between and journaled on the two side plates 229 and are designed to rest on the top surface of the supporting rail.

A pusher link 232 having an elongate slot 233 is pivotally connected at 234 (Fig. 35) to the body casting 228 and is thus free to rotate between the "down" position, in which it is shown in Figs. 35 and 36, and the "up" position in which it is shown in Fig. 37. Also pivotally connected at 236 to the body casting 228 is an arm 237 to whose upper end is pivotally connected a second link 238 having an elongate slot 239. When the pusher-carriage is installed on the wrapping machine, the two links 232 and 238 are engaged by the pusher bar 185 which extends through both slots 233 and 239, as clearly indicated in Figs. 34—36. An L-shaped standard 240 secured to the top of body casting 228 has a vertical leg 240a to which is pivotally connected, at 241 (Fig. 39), a member 243 which functions as a support for a trunnion 244 (Fig. 38) the axis of which normally extends at an acute angle to the vertical in a vertical plane transverse to the path of movement of the pusher-carriage along its supporting rail. An arm 245 is rotatably connected at one end to the trunnion 244 through the medium of a bored hub 245a. The arm 245 which will be referred to herein as the hold-down arm, is rotatable about a center coinciding with the axis of the trunnion 244. A sheet metal hold-down shoe 246 disposed below and extending parallel to the free end portion of the hold-down arm 245 is attached to the lower end of two parallel supporting pins 247 which pass through openings in the free end portion of the hold-down arm and are anchored thereto in any suitable manner, but preferably by means of a clamping plate 248 of chanenl-shape cross-section which embraces three sides of the free end portion of the hold-down arm and is provided with openings large enough to pass the pins 247. A clamping screw 249 (Fig. 34) is threaded through the hold-down arm and is adapted to press laterally against the clamping plate 248, thereby causing the latter to bear tightly against the sides of the two pins 247. Normally the screw 249 is tightened against the clamping plate 248, thereby fixedly anchoring the hold-down shoe 246 at the appropriate distance below the hold-down arm; but the elevation of this shoe relatively to said arm can easily be altered upon loosening the screw 249 and this is done whenever there is a change in the height of the article to be wrapped.

Each shoe 246 is arranged to overlie and press down slightly on one end portion, respectively, of the banded article, whereby to hold the same effectively in place on the subjacent track and also to flatten out the contacted end portion of the article in the event it consists of bulgy material, thereby rendering it practicable to neatly fold the ends of the wrapper, as previously described, and thus produce nicely finished packages without diminishing the hourly output of the machine.

A coil spring 250 anchored at one end to a bracket 252 that is affixed to the pusher-carriage, is connected at its other end to a chain 253 (see Fig. 39) which, in turn, is secured to the hub 245a of the hold-down arm. This coil spring, acting through the chain 253, serves to bias the hold-down arm 245 toward the hold-down or active position, as depicted in dot-dash lines in Fig. 34 and in full lines in Figs. 35 and 37.

A trunnion 254 threaded into the hub 245a and extending laterally therefrom carries a roller 255 which is disposed in the path of the arm 237. When this arm is rotated counterclockwise about its fulcrum 236 from the position in which it is shown in Figs. 35 and 37, it applies pressure to the roller 255 and trunnion 254, thereby rotating the hold-down arm 245, together with the hold-down shoe 246, to the retracted posture in which it is shown in Figs. 34 and 36. This retractive movement of the hold-down arm and shoe is effected as a consequence of tension applied to the link 238 by the pusher bar 185 during the final stage of the return movement thereof to its normal "at rest" position, as exhibited, for example, in Fig. 11 wherein it will be seen that the pusher-carriage 172 is blocked against further retractive movement by the stop 189. The same stop is employed to limit retractive movement of the pusher carriage 227, so that further retractive movement of the pusher bar 185, after the pusher-carriage has come to rest, is effective to apply enough tension to the link 238 to bring about retractive rotation of the hold-down arm 245 against opposition of the spring 250.

In Figs. 35 and 37 the hold-down mechanism is shown in the active posture which it assumes immediately after commencement of forward movement of the pusher bar 185, which, it will be remembered, takes place at the outset of each cycle of operation of the machine. In Figs. 34 and 36 the hold-down mechanism is shown in its retracted posture. Here it will be seen that the link 238 has been put under tension by virtue of the pusher bar 185 having returned to its "at rest" position at the termination of a retractive stroke. During the major portion of each retractive stroke of the pusher bar, the hold-down shoe remains in its "down" or "active" position, as per Figs. 35 and 37, because the spring 250 is stiff enough to resist the force necessary to retract the pusher carriage to the starting point; but as soon as the pusher-carriage encounters the stop 189 (Fig. 11) at the end of the track, it is not further movable in the return direction, and thereupon, and in consequence thereof, enough force is applied to the link 238 by the pusher bar 185 to overcome the spring 250, whereupon the hold-down arm is rotated about the axis of the trunnion 244, upwardly and outwardly along a planar path acutely angular to the horizontal and vertical planes. When thus retracted, the two hold-down arms and shoes are clear of the track, thus permitting free access to the track for placement thereon of a banded article; and at the same time both links 232 and 238 are down and out of the way, as depicted in Figs. 35 and 36, and accordingly do not impede the work of the operator.

The initial forward movement of the pusher bar 185 releases the tension on the link 238, thereby allowing the hold-down arm and shoe to be moved inwardly and downwardly by the spring 250, but it does not at once advance the pusher-carriage along the track because the link 232 is free to rotate about its pivotal center 234 and, consequently, does not apply any substantial force to the pusher-carriage. When, however, the link 232 has been rotated through a certain predetermined angle, as illustrated in Fig. 37, it positively engages the body casting 228, which then functions as a stop to prevent further rotation of the link 232, and thereupon the pusher-carriage is propelled along the track by the pusher bar, the hold-down arm and shoe then remaining in "down" position. As previously explained, the two ends of the wrapper are folded by the folding fingers and top folding wings before the pusher-carriages start their excursion along the track to transfer the package to the heat-sealing zone.

In the event that an article in process of being wrapped is, for any reason, of substantially greater thickness (height above the track) than that for which the holddown shoe has been adjusted, the latter, in moving toward the holddown or active position, will encounter the article prematurely and thus may be stopped short of its goal at a position in the path of the descending top-folding-wing unit D. Manifestly, an occurrence of that character would result in a failure of the machine to function properly and, quite probably, in damage to the machine. But such eventualities have been avoided in the present device: first, by mounting the trunnion 244 on the member 243 which is pivoted at 241; and, secondly, by providing the hold-down shoe 246 with a distinctly beveled or angular leading surface 256. By reason of this beveled or angular surface 256, the shoe 246 tends to be deflected upwardly upon prematurely encountering an obstacle, i. e. an over-thick package; and by further reason of the fulcrum at 241, the hold-down arm 245 is free to rotate in a vertical plane. This, it has been found, enables the bevel-edged shoe successfully to override the interference presented by inordinately thick articles, provided the excess is not too great. In actual practice, the thickness increments encountered have never been such that the aforedescribed antidote would not suffice.

The rotary movement of the hold-down arm 245 about the trunnion 244, under the impetus of the spring 250, is limited by the arm 237 which serves as a stop for the roller 255 and is itself stopped by engagement with the adjacent end of a stop screw 257 (Fig. 35) threaded into the body casting 228. This stop screw is adjusted so that the holddown arm 245 is horizontal, as per Fig. 35, when the arm 237 is bearing thereagainst. This ensures that the hold-down shoe will bear down uniformly on any flat article of uniform thickness to which the height of the shoe has been adjusted. If an article happens to be a little thicker or thinner than standard, the hold-down shoe will be slightly tilted lengthwise; but unless the deviation from standard thickness is extreme, this is of no consequence. Manifestly, such an extreme deviation from standard thickness as would cause the hold-downs to function inadequately, would result in a badly wrapped package on account of the wrapper being too long or too short and, for that reason, it is unnecessary to so design the hold-down that the shoe will assume a horizontal posture irrespective of the thickness of the article.

*The alternative hold-down of Figs. 40—43*

The package hold-down device of Figs. 40—43 is analogous in function to that of Figs. 34—39, but differs materially therefrom in mechanical detail and mode of operation. Here the hold-down is not an appendage of the pusher-carriage and does not move with the pusher-carriage lengthwise of the track. Its operation, however, is controlled and effected by the pusher bar 185 as in the previous case; and two of them are required, one for each track rail, each being a reverse counterpart of the other.

The pusher-carriage 172 and link 179 may be identical with that shown in detail in Figs. 20—22 and previously described; but the rail 260 (Fig. 43), although of cross-sectional configuration similar to the rail 121' of Figs. 20—22, differs therefrom in this respect, that the horizontal leg extends laterally beyond the outer side of the carriage, thus affording a ledge 261 which is clear of the path of the carriage.

The thin banded article 11 is positioned on the track, as before, at the front of the pusher-carriages and projects marginally, at both ends, beyond the outer limits of the pusher-carriages, as most clearly shown in Fig. 42. The unfolded end-flaps of the wrapper (not shown) extend outwardly beyond the outer edges of the rails where they are engageable by the folding fingers and the top-folding-wing units D in the same manner as has previously been explained. Those parts have been omitted from the present showing as unnecessary to a complete and adequate disclosure of the inventive features but their presence in the physical machine should not be overlooked.

A track-supporting member 262 is secured to the frame 80 of the machine, and welded to this member is a horizontal, laterally-projecting plate 263 constituting a bracket on which is mounted the hold-down mechanism about to be described.

Two parallel studs 264 secured to the bracket 263 and projecting upwardly therefrom are adjustably movable vertically; and attached to the upper ends of these studs, and supported thereby, is a rectangular bearing block 265 which is bored lengthwise of the track to receive a shaft 266 to one end of which is secured a bevel gear 267. The block 265 is also bored perpendicularly to the axis of the shaft 266 to receive a stud 269 on which is rotatably mounted a second bevel gear or pinion 270 in mesh with the gear 267. To the right-hand end of the shaft 266 is secured an arm 271 extending laterally to the axis of said shaft and attached at its free end to a hold-down shoe 272 in the form of a rectangular bar. The latter extends lengthwise of and parallel to the rail 260 and is so positioned that it is capable of being superimposed upon the adjacent marginal portion of the banded article 11, as shown in Figs. 41 and 43, when moved counterclockwise from the position of Fig. 42 to that of Fig. 43. The former is the position assumed by the hold-down shoe when the machine is at rest, while the latter is the active position.

An arm 273 attached to the gear 270 is pivotally connected at 274 to a rod 275 having a hooked end portion 276 adapted to be engaged by the pusher bar 185 in the manner depicted in Fig. 40; and a coil tension spring 278 attached to the rod 275 biases the arm 273 clockwise, as viewed in Figs. 40 and 41, thereby tending to rotate the shaft 266 in the counterclockwise direction, as per Fig. 42.

When the pusher bar 185 is retracted toward the "at rest" position, as per Fig. 40, it engages, en route, the hook 276, applying tension to the rod 275 and thus rotates the arm 273 against opposition of the spring 278, thereby causing the hold-down shoe 272 to move to the "Off" position in which it is shown in Figs. 40 and 42.

Upon the clutch-control mechanism being tripped and the machine thus set into motion, the pusher bar 185 moves forwardly along its arcuate path, and its initial effect is to relieve the tension on the rod 275, thereby allowing the hold-down shoe 272 to be moved by the spring 278 to the hold-down position in which it is shown in Figs. 41 and 43. Thereafter, the pusher bar disengages the hook 276 but continues to act on the link 179, rotating the same about its fulcrum, and subsequently moves the pusher-carriage 172 along the track, thus propelling the package into the heat-sealing zone, as depicted in Fig. 41.

*The hold-down attachments on the front and rear folding fingers—Figs. 44 and 45*

Another feature of this invention, illustrated in Figs. 44 and 45, is particularly useful in the wrapping of thin articles. It consists in the provision of hold-down attachments 280 which may conveniently take the form of metal plates, each having a laterally-projecting ear 281 and a clearance notch 282. These plates are secured in any practicable manner, as by screws or rivets 283, to the upper end portions, respectively, of the front and rear folding fingers 129 and 130. The ears 281 are so positioned that when the fingers 129 and 130 are actuated to perform the previously-described side folding operations, said ears will over-ride the adjacent edge portions of the top end-flaps of the wrapper, as illustrated in Fig. 45, before the side folding operations get under way; and they reinforce the same in the manner of abutments or backstops, against upward displacement tending to result from the action of the fingers 129 and 130.

Displacements of such character would prevent correct effectuation of the side folds on thin packages, and they are successfully obviated by the above described provision. The result is a clean-cut folding job, such as cannot be achieved on thin packages without an effective hold-down device.

It is to be noticed that the hold-downs of Figs. 44 and 45 do not overlie any part of the article being wrapped, and do not serve the same purpose as either of the previously-described hold-down devices. In fact, they ordinarily are employed conjointly with one or the other of the previously-described hold-downs.

*The pull-thru mechanism of Figs. 46—48*

There has previously been described the so-called push-thru mechanism, depicted in Figs. 24—27, the function of which is to propel each successive package into and through the heat-sealing zone at a single stroke, without intermission; and it was explained that the object of so doing is to obviate injury to heat-sensitive packaged merchandise such as butter, ice cream and the like. The aforedescribed push-thru mechanism is a relatively inexpensive adjunct and serves its purpose adequately; but there are occasions when it is preferable to employ a somewhat lower sealing temperature and allow each package to remain in contact with the hot plates for a slightly longer period than obtains with the push-thru mechanism, but not by resort to reducing the speed of the machine and correspondingly reducing its output.

The function of the pull-thru mechanism illustrated in Figs. 46—48 is to transfer packages from the heat sealing zone onto the cooling bed of the machine following a brief period during which the package remains at rest in the heat-sealing zone, the period being of longer duration than obtains when using the previously-described push-thru mechanism, and of much shorter and more definite duration than where each package is ejected from the heat-sealing zone by the next succeeding one.

Adverting to the perspective assembly view of the machine (Fig. 1), there is shown attached to the rocker arm 98 a fitting 285 to which is pivotally connected one end of a bar 286 the remote portion of which is a rack comprising a series of teeth 287 (see Fig. 46) which are meshed with a spur pinion 288 mounted on a cross-shaft 289. The toothed portion of the rack bar 285 is slidably supported in a housing 290 which is carried by the cross-shaft 289 and serves to maintain the rack teeth properly in mesh with the teeth of the pinion 288 while permitting the rack bar to reciprocate freely. The housing 290 being rotatable on the shaft 289 is thereby adapted to accommodate rocking movements of the bar 285 occasioned by the fact that its driven end moves in an arcuate path rather than a rectilinear one. The cross-shaft 289 is journaled at its respective ends on uprights 291 which are attached to and carried by the frame of the machine; and this cross-shaft is approximately coextensive in length with the width of the cooling bed 186, which it overlies.

Another shaft 293, paralleling and spaced horizontally from the shaft 289, is supported on two stanchions 294, at either end thereof, which are bolted at their lower extremities to bars forming component parts of the cooling bed. The shaft 293 need not be rotatable, since it serves only as a supporting member and guide. A casting 295 is mounted on and supported by the shaft 289, but is not rotatable therewith; it is, however, slidable on this shaft, lengthwise thereof.

A pair of laterally contraposed guide rails or tracks 296 of channel-shape cross-section (see Fig. 48) are mounted upon and supported by the casting 295 and the shaft 293 to the latter of which they are anchored through the medium of a suitable fitting 297 which is secured at one end to the two guide rails and slidably connected to the shaft 293. A clamping screw 298 (Fig. 47) threaded into the fitting 297, and adapted to pressingly engage the shaft 293, serves to releasably lock the guide rails 296, as well as the casting 295, in any selected position of adjustment laterally of the machine. Such adjustments are made to accommodate packages of diverse lengths.

A rack bar 299 centrally positioned between the two guide rails 296 is meshed with a pinion 300 (see Fig. 48) which is keyed to the shaft 289 and rotatable therewith, but slidable therealong, together with the casting 295 in which said pinion is housed. To avoid obscuration of the pinion 300, the casting 295 has been omitted from Fig. 48.

Four rollers 302, disposed in pairs at either side of the rack bar 299 and carried thereby on suitable trunnions 303, are mounted on the respective lower flanges of the guide rails 296, as exhibited most clearly in Fig. 48. The rack bar 299 is, therefore, reciprocable lengthwise along said guide rails and, obviously, is adapted to be so reciprocated in response to the reciprocations of the rack bar 285.

Attached to the left-hand end of the rack bar 299, as viewed in Figs. 46 and 47, is a bracket or head casting 304 having a vertical guideway 305 in which is mounted, for vertical reciprocation, a slide 306 to the lower end of which is attached a package-engaging paddle 307. A link 308 is pivotally connected at its lower end to the slide 306 and at its upper end to an arm 309 of a bellcrank 310, the other arm of which is identified by the reference numeral 311. This bellcrank 310 is fulcrumed at 313 on a yoke 314 secured to the top surface of the rack bar 299 by means of machine screws 315. The arm 311 carries a counter-balancing weight 316 and a laterally offset roller 317, the function of which will presently be explained. A stop screw 318 carried by the arm 309 serves to limit its downward movement and, correlatively, the downward movement of the slide 306 and paddle 307.

Secured to one of the guide rails 296 is an upright member 319 having a laterally projecting flange 320, and fulcrumed to this upright member at 322 (Fig. 46) is a rotatable roller-guide element comprising a horizontal arm 323 and an upwardly inclined arm 324. The arms 323 and 324 are in vertical alignment with the roller 317, as best shown in Fig. 48. The path followed by the roller 317 is delineated by a series of arrows and identified (Fig. 46) by the reference numeral 325.

As will be apparent from the position of the roller 317 along its path 325, the rack bar 299 and the parts carried thereby have moved some distance to the right from their leftwise limit of travel; and it is assumed that this rack bar and attached parts are continuing their movement to the right. The slide 306 and paddle 307 are seen to be in their downmost positions. When the rack bar 299 has moved considerably further to the right, the roller 317 will engage the inclined arm 324 of the roller-guide element and thereby cause said element to rotate clockwise, thus allowing the roller to pass.

Upon the reverse stroke of the rack bar 299, after completing its excursion to the right, the roller 317 will engage the under surface of the arm 324 by which it will be deflected downwardly, due to the fact that the roller-guide element cannot rotate counterclockwise from the posture in which it is shown in Fig. 46. This results from the fact that the arm 323 is obstructed by the flange 320 on which it normally rests.

The roller 317, following the inclined under surface of the arm 324, effects clockwise rotation of the bellcrank 310, thus elevating the distal end of the arm 309, together with the link 308, the slide 306 and the paddle 307. It will be seen that the inclined arm 324 is what is known as a gated cam.

As the rack bar 299 continues its movement to the left, the roller 317 leaves the under surface of the arm 324 and passes to the under surface of the flange 320, wherefore the slide 306 and paddle 307 are kept in elevated position until said rack bar 299 has nearly completed its travel to the left. Upon reaching the left-hand end of the flange 320, the roller 317 is released and thereupon the slide and paddle are free to descend. Each cycle of operation includes lifting the paddle as it moves toward the front of the machine whereby to clear the package which is to be pulled through and then lowering the paddle and pulling it back with the package. The paddle 307 is so positioned relatively to the bottom hot plate 182 that is moves thereover while elevated and then drops down on the far side of the package resting on said hot plate; and the timing is such that the package is removed from the heat-sealing zone following a very brief interval after being placed thereon.

Inasmuch as the present machine is designed to wrap articles of widely variant sizes, it manifestly is necessary to be able to move the paddle 307 laterally of the machine so as to center the same relatively to the package. This can be done after loosening the clamping screw 298, by shifting the entire unit including the guide rails 296 and the casting 295.

The preceding description of the pull-through mechanism comprehends an installation which is sufficient, without more, to handle the majority of packages; but when there is wrapping of unusually thin packages, or soft packages which are apt to be injuriously crushed as a result of being propelled in a continuous train along the cooling bed, it is desirable to modify the mechanism by addition of the ancillary package-propelling means about to be described.

As shown in Figs. 46, 46a and 47, the ancillary package-propelling means comprises two package-engaging propeller arms 326 which are pivotally connected at 326a to a horizontal supporting plate 327 from which they normally incline downwardly in the forward direction to a level close to the top surface of the cooling bed along which the packages move, as clearly shown in Fig. 46. The plate 327 is attached to an arm 327a through the medium of a pair of angle brackets 328 each adjustable vertically thereto by means of bolts 328a which pass through vertically elongated slots 328b provided in the arm 327a. This arm which is of right-angular formation (see Fig. 46) has its upper end welded to a horizontally disposed bar 329 overlying and extending parallel to the rack bar 299 to which it is detachably connected and with which it is reciprocable lengthwise of the cooling bed.

The propeller arms 326 are so spaced apart lengthwise of the line of travel of the packages that the propeller arm nest in order to the paddle 307 will, during each rearward stroke, ride over the package which was last propelled forwardly by the paddle 307; and the other propeller arm 326 will at the same time ride over the last-but-one package propelled forwardly by the same paddle. Therefore, during each forward stroke of the pull-through mechanism three packages, spaced apart from each other, will be simultaneously propelled forwardly along the cooling bed, one by the paddle 307 and one each by the two propeller arms 326. Manifestly a larger or smaller number of propeller arms can be employed when circumstances warrant; and the plate 327 can be extended lengthwise, if need be, to accommodate additional propeller arms.

Whenever the ancillary propeller mechanism is not needed, it may be removed, and in order to expedite this operation, and thus shorten shut-down intervals, there is provided a novel quick-acting attachment means including a strip 330 of T-shape cross-section (see Figs. 46a and 59) which is affixed to the top surface of the rack bar 299 and extends lengthwise thereof. This T-strip serves as a base or mounting to which the bar 329 is detachably secured. Two annularly grooved pins 330a are secured to and project upwardly from the top of the strip 330, passing through corresponding openings in the bar 329; and overlying this bar and pivotally connected thereto by means of a pivot pin 329a (affixed to the bar 329) is a strap 334 having edgewise slots 334a each adapted, upon rotation of the strap about the pivot pin 329a, to enter the annular groove in one of the pins 330a, thereby serving to releasably lock the bar 329 to the strip 330. If some such preventative measure were not taken, the strap 334 might, as a result of vibration of the machine, become displaced from engagement with the pins 330a and thus allow the ancillary propeller mechanism to become detached. To achieve a high degree of expedition, as respects attachment and detachment of the ancillary mechanism, the preventative measure must itself be quick-acting and at the same time immune to the vibration of the machine; and to that end an arm 339 having depending ears 339a is hinged at 339b to the adjacent end of the strap 334. When the arm 339 is in its normal position (see Fig. 46) the ears 339a jointly embrace the bar 329 and thus serve to prevent rotation of the strap 334 about its pivotal center, thereby securing the same against disengagement from the annular grooves of the pins 330a. Release of the ancillary propeller mechanism is effected by swinging the arm 339 upwardly about its hinge and then rotating the strap 334 to disengage the pins 330a. The whole ancillary mechanism can then be detached quickly and with little effort, and reattachment thereof can be just as quickly accomplished.

*The transmission and clutch control mechanism of Figs. 2 and 50–56 inclusive*

It has already been stated that the motor 10 runs continuously and is connected through the medium of a drive-belt 83 with a pulley 84 keyed to one end of a shaft 85, to whose other end is keyed a spur pinion 86 which is in mesh with a spur gear 87 to the hub of which is fixedly secured the driving member of a positive clutch 89.

The gear 87, together with the clutch driving member 330, is carried by a shaft 331 on which it runs freely, and is secured against axiswise displacement by a stationary dog 332 a portion of which engages an annular slot 333 in the hub of the gear 87.

The shaft 331 extends through and is supported by a tube 335 each end of which is provided with a bushing 336 in which said shaft is journaled. The tube 335 is supported by and welded to the under sides of a pair of laterally spaced angle irons 337 and 338 which, in turn, are attached to and supported by the frame 80 of the machine. The shaft 331 is both rotatable and reciprocable lengthwise in its bearings. The driven member 340 of the clutch 89 is riveted to the crank arm 102, and the latter is keyed or otherwise fixedly secured to the right-hand end of the shaft 331, as viewed in Fig. 51.

The two clutch members 330 and 340 are shown disengaged in Fig. 51. They are adapted to interengage when the shaft 331 is moved to the left; and for that purpose, said shaft is provided with a collar 341 forming an abutment for one end of a compression spring 342 the other end of which bears against the adjacent end of the tube 335. It will be self-evident that the shaft 331 is springbiased in the direction to effect engagement of the clutch; and that in the absence of any provision for counteracting the biasing spring, thus clutch would remain engaged continuously, thus keeping the machine in continuous, uninterrupted operation.

Another shaft 345 is disposed axially parallel to the shaft 331 and spaced laterally therefrom, and the right-hand end of the shaft 345 (see Fig. 51) is drilled and tapped to receive the threaded end of a hex-head machine screw 346 which is locked to the shaft by means of a locknut 347.

The shank of the screw 346 extends through the spacing sleeve 348 which bears against the vertical leg of the angle iron 338, and a coil spring 349 serves to bias both the screw and the shaft leftwise. The shaft 345 is supported intermediately in a bearing on the angle iron 337, and it is reciprocable rotationally through an acute angle E, as indicated in Fig. 54. The purpose of the screw 346 and locknut 347 is to permit the position of the shaft 345 to be adjusted axiswise; and the function of the spring 349 is to restrain said shaft against unwanted axiswise movement while at the same time permitting free rotation thereof.

A laterally extending arm 350 is welded to the shaft 331 and carries a hardened steel roller 352. A second arm 353 extends laterally from and is welded to the shaft 345. This second arm 353 carries a hardened steel roller 354 of dual-tapered external configuration the significance of which will presently be made plain. The two arms 350 and 353 are so relatively positioned that the two rollers 352 and 354 will either interfere or not interfere depending upon the rotational posture of the shaft 345. When this shaft is so turned that the axis of the arm 353 is inclined downwardly (Fig. 53) the roller 354 is partially in the path of revolution of the roller 352, and is, accordingly, adapted to intercept the roller 352 during each revolution of the shaft 331.

When the machine is at rest, the positions of the two rollers 352 and 354 are those illustrated in Figs. 52 and 53, also Figs. 50 and 51, and it will be apparent from an examination of those figures that the roller 352 has been diverted from its normal path of revolution by the roller 354, and that by reason of such diversion the shaft 331 is offset axiswise, against the spring 342 in the direction to effect disengagement of the clutch 89. If the shaft 345 be rotated clockwise, through the angle E (see Fig. 54), the roller 354 will, as a result, be so re-located that it no longer conflicts with the roller 352. Hence, the shaft 331 becomes at once free to move axiswise under the impetus of the spring 342 and, at the same time, the roller 352 becomes free to revolve in its normal orbit, as it is shown doing in Fig. 54.

The shaft 331, together with the arm 350 and the roller 352 would continue to rotate indefinitely if the roller 354 were retained in its elevated nonconflicting position, as per Fig. 54, but such is not the mode of operation of the machine.

Immediately following each clockwise rotation of the shaft 345, (which is effected through the medium of the arm 103 and link 97, in response to a manual operation of the U-shaped manual control bar 90 or foot treadle 91 (Fig. 1) as previously explained) this shaft is restored to its normal posture of rotation (Fig. 53) and the roller 354 is resultantly in position to intercept the roller 352 before the latter has quite completed a full revolution. As the roller 352 nears completion of its circuit of revolution, it makes contact with the outermost frustro-conical surface 356 of the roller 354 and is deflected thereby so as to move the shaft 331 in the direction to disengage the clutch 89. Adjoining the first frustro-conical portion 356 of the roller 354 is a second frustro-conical portion 357 having a much smaller included angle than the portion 356. The function of this second frustro-conical portion will be explained following some preparatory remarks which immediately follow.

The mechanism is so adjusted by means of the screw 346 (which serves to vary the axiswise location of the shaft 345) that, as soon as the roller 352 has passed an annular shoulder 351 formed by the juncture of the two frustro-conical portions 356 and 357, the two clutch members 330 and 340 will be disengaged. But upon disengagement of the clutch, the power to drive the shaft 331 is cut off, and this shaft together with the parts driven thereby do not have enough momentum to continue the rotation of said shaft far enough to effect an adequate clearance between the teeth of the two clutch members. Consequently, it has been found, the teeth of the two clutch members would be apt to frictionally interengage, end-to-end, and thus create a good deal of noise unless some effective provision is made to the contrary.

Referring to Fig. 2, wherein the rocker arm 98 is in the starting or idle position, it will be evident that at the completion of each cycle, before the clutch is disengaged, the roller 100 is in contact with the right-hand side of the curved slot 99; and it will be further evident, upon reflection, that the next movement of the roller 100 will be such as to re-direct it into contact with the opposite side of said slot. There is enough clearance between the roller and slot so that in making that transfer, the crank arm 102 and shaft 331 will rotate slightly before the roller contacts the opposite side of the slot. But said shaft and the parts carried thereby lack sufficient momentum to effect the transition against the opposition interposed by the roller 354. To overcome that condition there is provided a small lever 360, fulcrumed to the rocker arm 98 at 361 and carried by said rocker arm. One end of the lever 360 makes contact with the roller 100 and is pressed thereagainst by a coil spring 362 connected between one end of said lever and a bracket on the rocker arm 98.

When the clutch 89 is disengaged as a result of the roller 352 contacting the frustro-conical portion 356 of the roller 354, the pressure exerted by the lever 360 against the roller 100, by virtue of the spring 362, is effective to rotate the shaft 331 to such an extent that the roller 352 will ride up on the slightly tapered frustroconical portion 357 of the roller 354. This brings about an additional axiswise movement of the shaft 331 which is sufficient to effect adequate clearance between the ends of the clutch teeth.

An annular rounded flange 364 on the roller 354 serves as a semi-positive stop for the roller 352; and ordinarily, this flange is sufficient to prevent over-running of the shaft 331 such as would cause the clutch to re-engage contrary to intention. But if for any reason, as has happened in the past, the clutch 89 should fail to disengage, the roller 352 can ride over the flange 364 without any damage being done. This, of course, would cause the machine to go through repeated cycles of operation without stopping and would call for a shut-down for repairs; but if a positive stop were to be employed, instead of the semi-positive stop afforded by the flange 364, such an occurrence as that mentioned above would be likely to result in breakage or serious damage to one or another part of the clutch-control mechanism.

It would be feasible to use a roller 354 but with a single taper of small angularity; but to do so would result in slow disengagement of the clutch, and it is desirable that the clutch be disengaged quite abruptly. But the angularity of taper of the frustro-conical portion 356 which is essential to quick clutch disengagement is not desirable after the clutch disengagement has taken place and while the shaft 331 is being given the aforedescribed supplemental rotation. Such is the explanation for the use of two distinct tapered portions on the roller 354. In an actual case, the taper angle F (Fig. 55) is 28° and the taper angle H is 16°, but these are not to be regarded as particularly critical angles.

This case is a division of our application filed March 7, 1949, under Serial No. 79,956, now Patent #2,654,196, October 6, 1953.

We claim:

1. In combination, a wrapping machine operative through a cycle to wrap and seal a banded article, said machine having a loading station immediately adjacent an operator's position, and a sheeter operative through a cycle to cut and deliver a sheet of wrapping material, said sheeter having a banding station immediately adjacent said operator's position and providing a platform for the manual banding of a sheet fed thereto around an article, said sheeter including a shear, a belt conveyor extending from the discharge side of said shear through and beyond said banding position, the belt of said conveyor being adapted to convey a continuous series of shear-cut sheets of wrapping material from said shear to said banding position, means for driving said wrapping machine and sheeter through a cycle, means operated automatically at the end of each cycle to stop the sheeter and wrapping machine, and manually actuated means for rendering operative said driving means to drive the sheeter and wrapping machine through a successive cycle.

2. In combination, a wrapping machine operative through a cycle to wrap and seal a banded article, said machine including a track, a pusher-carriage for propelling packages along said track, a pusher bar for actuating said pusher-carriage, a pair of rocker arms jointly supporting said pusher bar and connected thereto at their respective distal ends, said rocker arms having a common axis of oscillation, motor means for oscillating the rocker arms, a sheeter operative through a cycle to cut and deliver a sheet of wrapping material, said sheeter including a shear and a belt conveyor extending from the discharge side of said shear through and beyond a banding position located immediately adjacent the wrapping machine operator's station at the loading end of said track, said belt conveyor including a drive-shaft, a gear, a unidirectional clutch interconnecting said gear with said drive-shaft, a rack meshed with said gear, said rack being pivotally connected at one end to one of said rocker arms and adjustably movable at said one end lengthwise of said last-mentioned rocker arm whereby to alter the stroke of said rack, manually actuated means for effecting a driving connection between the motor means and the rocker arms to drive the wrapping machine and the sheeter through one cycle of operation, and means operable automatically at the end of each such cycle to disestablish said driving connection.

3. In combination with a sheeter having a shear and a belt conveyor extending from the discharge side of said shear through and beyond a banding position located immediately adjacent an operator's station, said belt conveyor including a drive-shaft, and a wrapping machine having a track, a pusher-carriage movable to propel a banded article along the track, and means for folding the sheet banded around an article, drive means synchronously intercoupling the sheeter and the wrapping machine comprising a motor, a rocker arm, manually operable means for connecting the motor to the rocker arm to oscillate the arm in a forward and return stroke, means operated automatically at the end of each return stroke of the rocker arm to disconnect said arm from the motor, a pusher bar connected to the rocker arm and to the pusher-carriage to move the carriage along said track, means interconnecting the rocker arm and the folding means to operate said folding means with oscillation of the arm, a gear, a unidirectional clutch interconnecting said gear with said drive-shaft, and a rack meshed with said gear, said rack being pivotally connected at one end to said rocker arm and adjustably movable at said one end lengthwise of said rocker arm whereby to alter the stroke of said rack, the arrangement being such that said conveyor is driven unidirectionally and intermittently, one step per cycle of operation, the length of each step being variable by moving the pivotally connected end of said rack lengthwise of said rocker arm.

References Cited in the file of this patent

UNITED STATES PATENTS

| Number | Name | Date |
|---|---|---|
| 1,195,228 | Johnson | Aug. 22, 1916 |
| 1,549,540 | Hawthorne | Aug. 11, 1925 |
| 2,176,571 | Heckman | Oct. 17, 1939 |
| 2,592,726 | Palmer et al. | Apr. 15, 1952 |